(12) United States Patent
Stone et al.

(10) Patent No.: US 6,435,211 B2
(45) Date of Patent: Aug. 20, 2002

(54) HVAC DAMPER

(76) Inventors: William L. Stone, 110 Mesa Vista Rd., Grand Junction, CO (US) 81503; Garrick S. Stone, 306 W. 5th St. (P.O. Box 1333), Palisade, CO (US) 81526

( * ) Notice: Subject to any disclaimer, the term of this patent is extended or adjusted under 35 U.S.C. 154(b) by 0 days.

(21) Appl. No.: 09/867,116

(22) Filed: May 29, 2001

Related U.S. Application Data

(63) Continuation-in-part of application No. 09/352,235, filed on Jul. 13, 1999, now Pat. No. 6,237,630.

(51) Int. Cl.[7] ............................. F16K 1/22; F24F 13/10
(52) U.S. Cl. ................................................ 137/601.12
(58) Field of Search ..................... 137/73, 74, 75, 137/77, 601.01, 601.12, 601.14, 601.15; 192/56.55, 56.56; 251/67, 212, 250, 901; 454/333, 369

(56) References Cited

U.S. PATENT DOCUMENTS

| | | | |
|---|---|---|---|
| 594,727 A | 11/1897 | Cooper | |
| 2,320,007 A | 5/1943 | Otto | |
| 2,360,888 A | 10/1944 | Peple, Jr. | |
| 2,400,044 A | 5/1946 | Hermanson | 98/41 |
| 2,672,088 A | 3/1954 | Orr | 98/14 |
| 2,884,005 A | 4/1959 | Honerkamp et al. | 137/601 |
| 3,275,031 A * | 9/1966 | Alyea et al. | 137/601.06 |
| 3,329,163 A | 7/1967 | Barker et al. | 137/601 |
| 3,412,755 A | 11/1968 | Mason | 137/517 |
| 3,768,512 A | 10/1973 | Lahaye | 137/601 |
| 3,847,210 A | 11/1974 | Wells | 165/103 |
| 3,894,481 A * | 7/1975 | Alley | 454/318 |
| 3,958,605 A | 5/1976 | Nishizu et al. | 138/46 |
| 4,253,492 A * | 3/1981 | Sullivan | 137/601.06 |
| 4,457,336 A | 7/1984 | Allan et al. | 137/601 |
| 4,472,999 A | 9/1984 | McCabe | 98/1 |
| 4,487,214 A * | 12/1984 | Tatum | 137/74 |
| 4,506,825 A | 3/1985 | Grant | 236/9 AQ |
| 4,535,811 A | 8/1985 | Wood et al. | 137/601 |
| 4,555,981 A | 12/1985 | McCabe | 98/1 |
| 4,592,535 A | 6/1986 | Magill et al. | 251/298 |
| 4,766,807 A * | 8/1988 | Davis | 454/333 |
| 5,123,435 A | 6/1992 | Blacklin et al. | 137/1 |
| 5,398,910 A | 3/1995 | Kitazawa | 251/129.11 |
| 5,577,525 A | 11/1996 | Wirfel et al. | 137/75 |
| 5,921,277 A | 7/1999 | Bernal | 137/556.3 |
| 6,019,679 A | 2/2000 | Lloyd | 454/369 |

OTHER PUBLICATIONS

U.S. application No. 09/352,235, filed Jul. 13, 1999, by Stone et al.

* cited by examiner

*Primary Examiner*—Michael Powell Buiz
*Assistant Examiner*—Ramesh Krishnamurthy
(74) *Attorney, Agent, or Firm*—Allen H. Erickson

(57) ABSTRACT

A fail-safe HVAC damper apparatus comprises a duct channel with a closure comprising one or more quadri-panel hinged elements, each with four panels connected by four parallel hinge pins. A gear shaft with a toothed gear is controllably rotated to linearly drive a spring-biased plate to move one of the hinge pins of each quadri-panel element between an open and a closed position. A damper may use blades of different sizes and be driven to begin an opening and/or closing action sequentially and/or very gradually. A drive motor may be activated to open or close the closure, e.g. by a smoke detector or other controller. Melting of a fuse in the duct channel serves to disengage a gear from a gear shaft, enabling a spring mounted plate to move the hinged elements to a default closed (or alternative open) safety position. Various gear shaft and gear structures are shown.

33 Claims, 32 Drawing Sheets

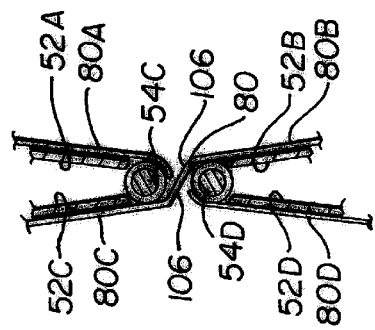
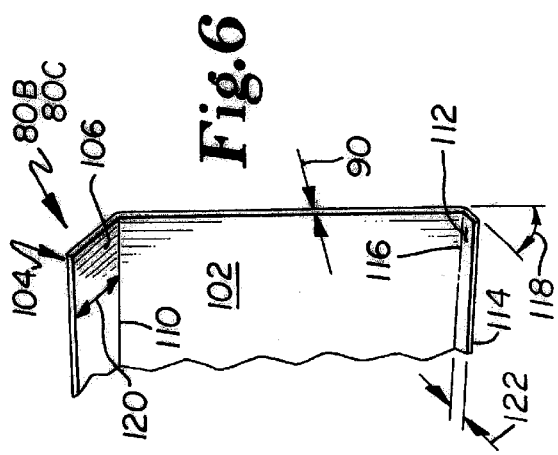
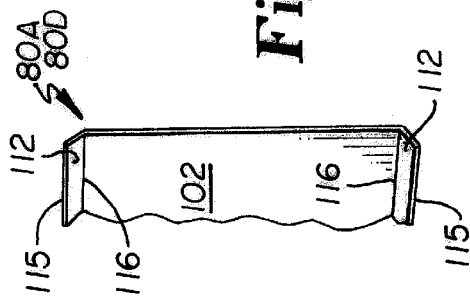
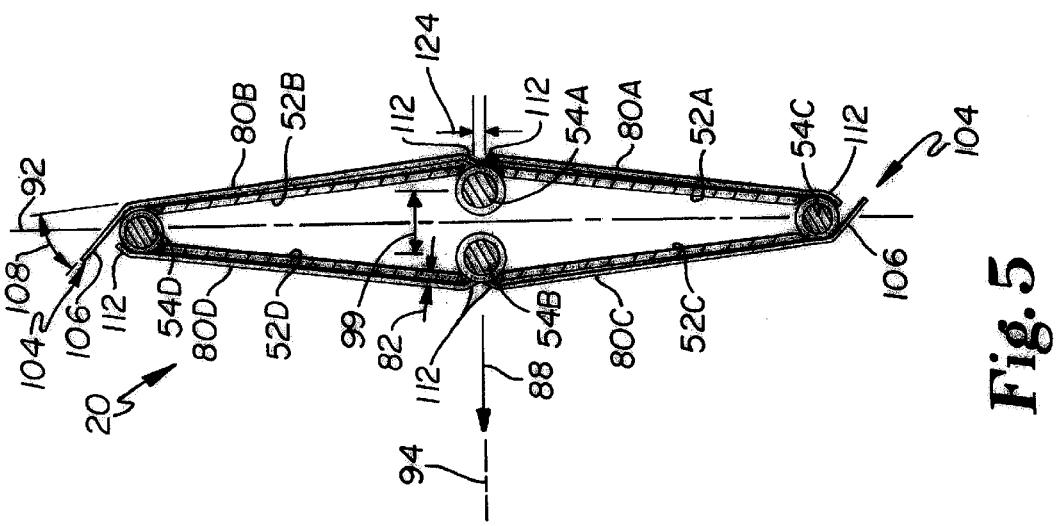

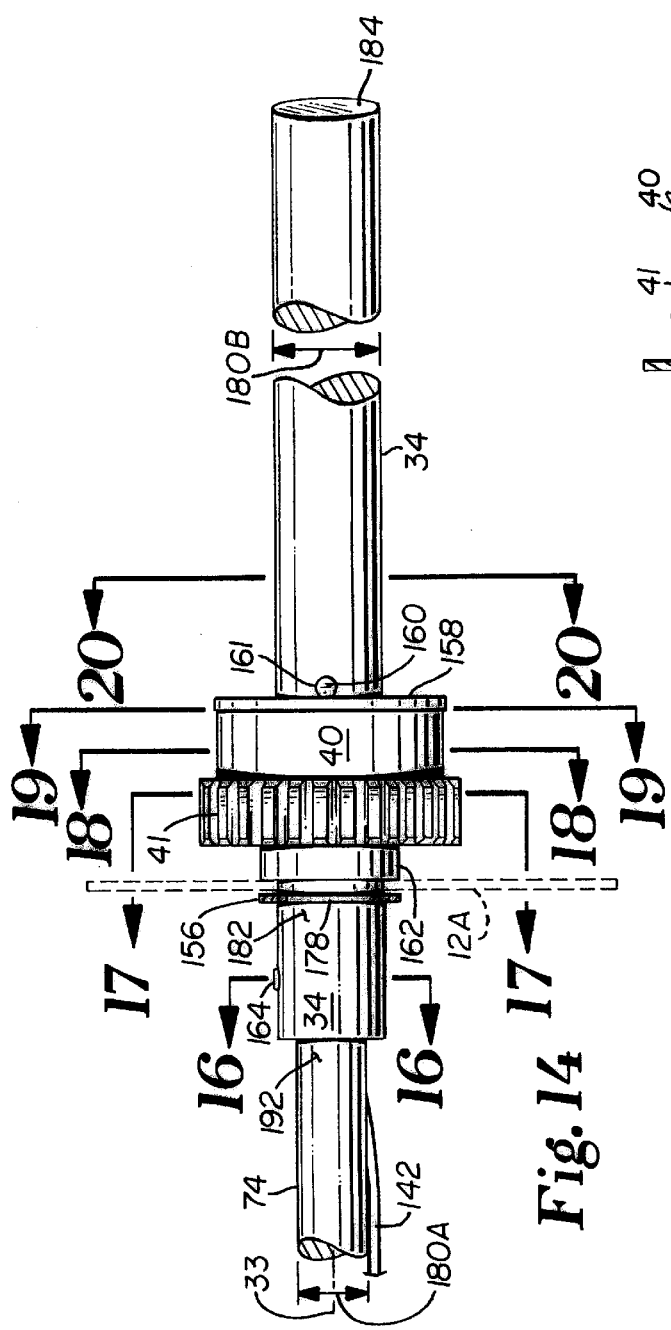
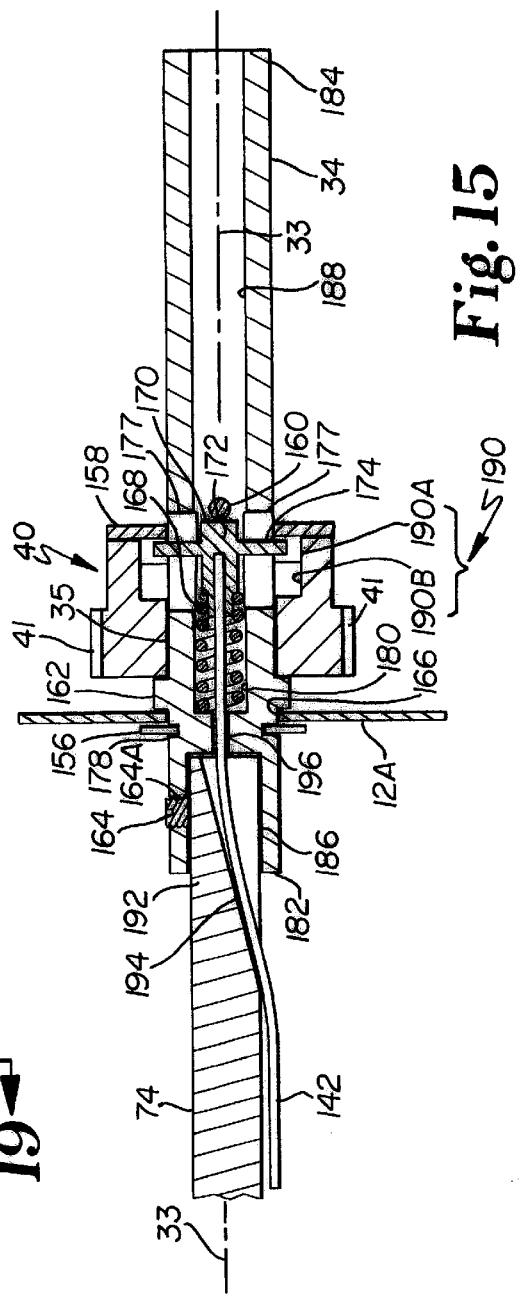
Fig. 14
Fig. 15

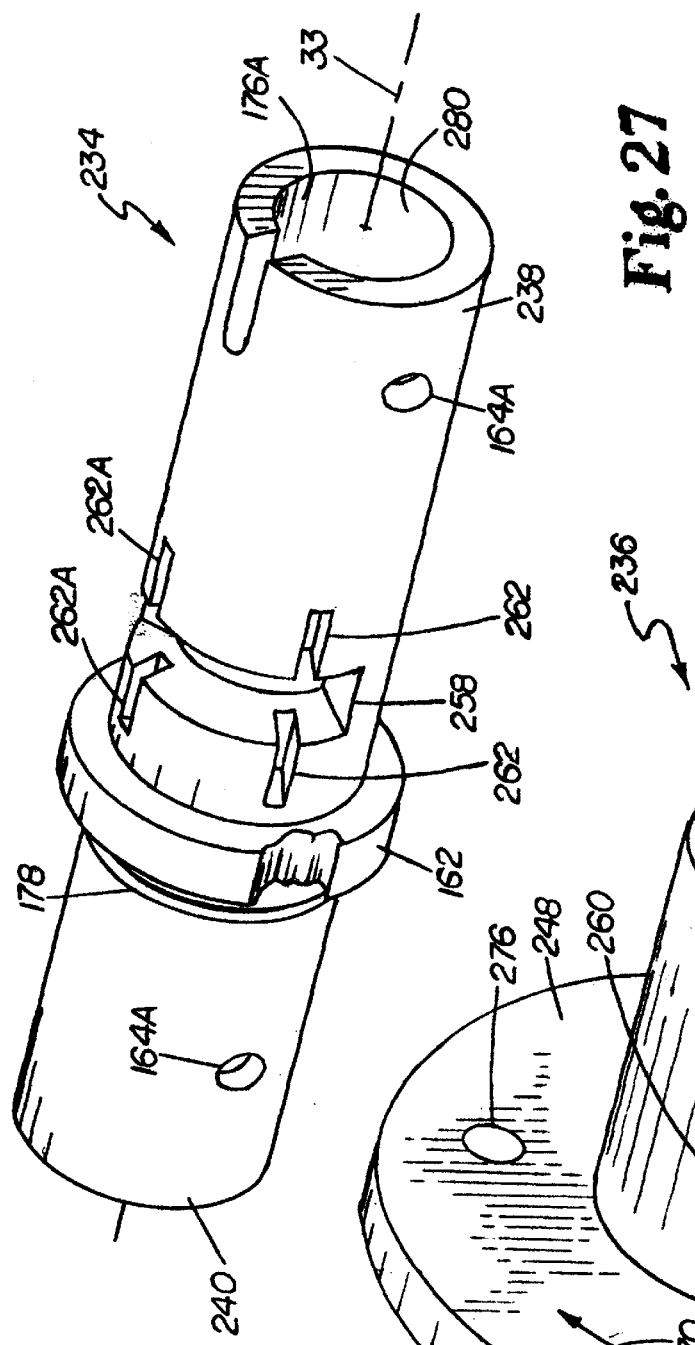
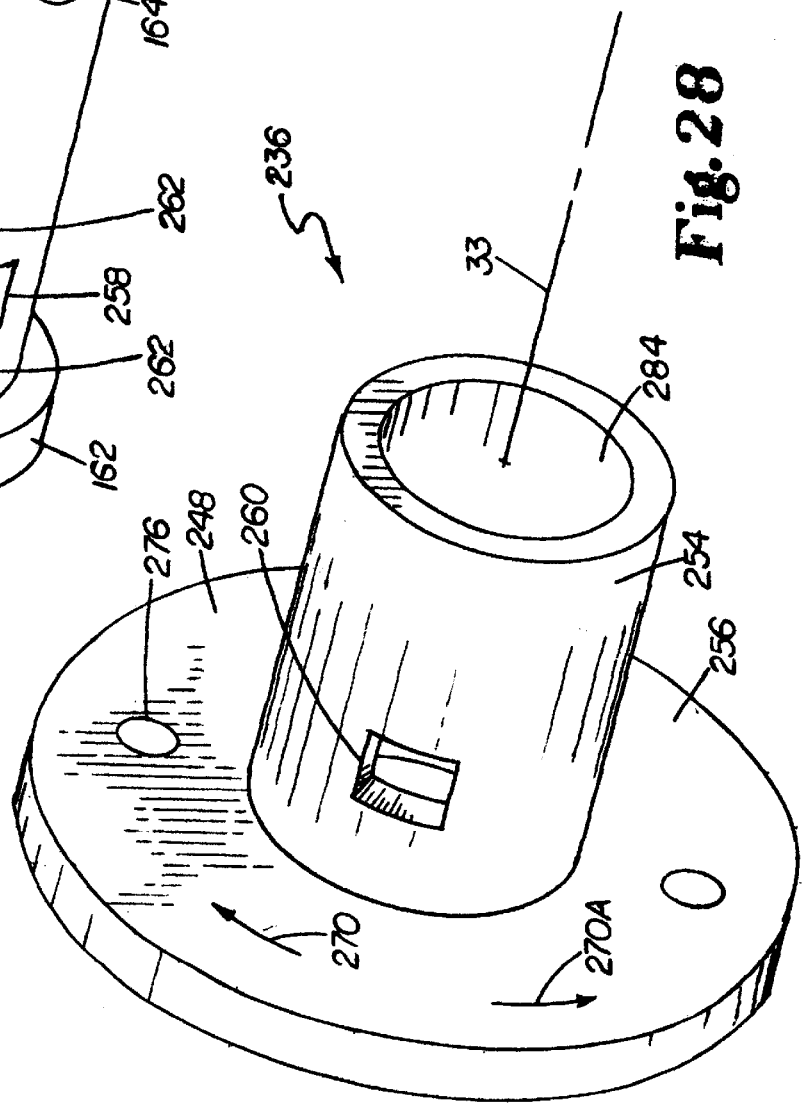

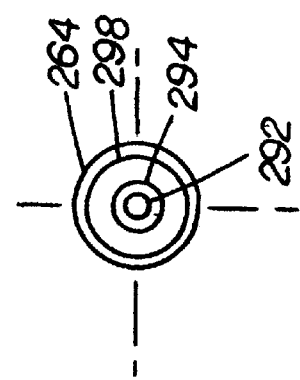
Fig.41
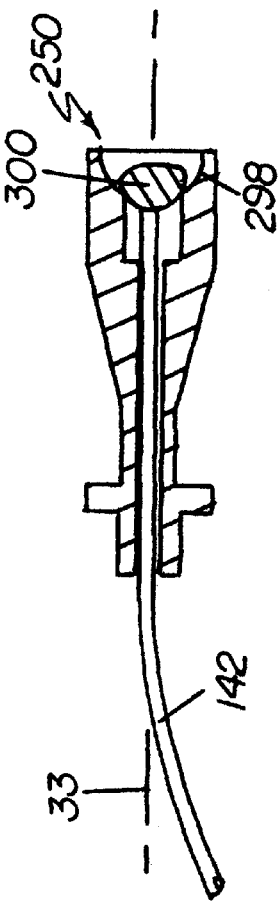
Fig.43
Fig.40
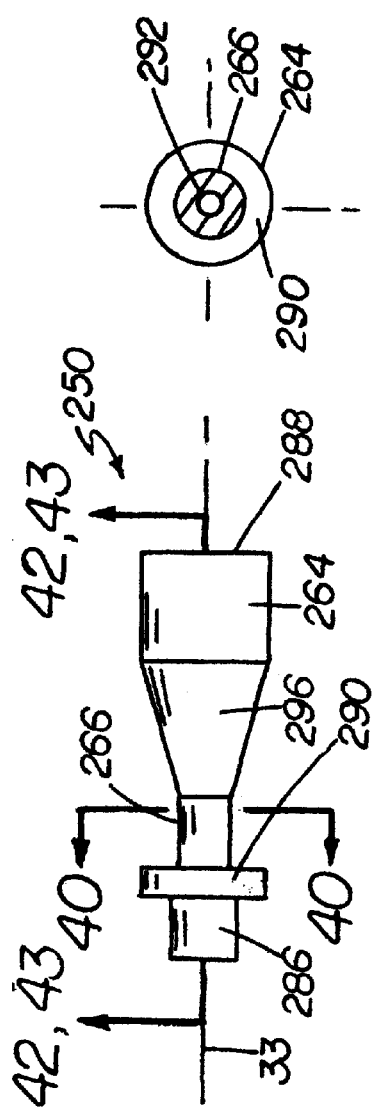
Fig.39
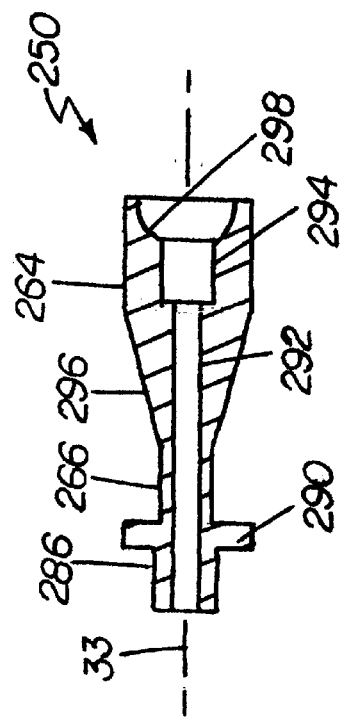
Fig.42

HVAC DAMPER

This application is a continuation-in-part of Ser. No. 09/352,235 filed Jul. 13, 1999, now U.S. Pat. No. 6,237,630 B1, issued on May 29, 2001.

BACKGROUND OF THE INVENTION

1. Field of the Invention

This invention relates generally to dampers for regulating fluid flow. More particularly, the invention pertains to apparatus for dampening gas flows in heating, ventilation and air conditioning (HVAC) applications, including use as a smoke safety damper and/or a fire safety damper.

2. State of the Art

Variable flow dampers have been used for a long time to control air flow rates in heating, ventilating and air conditioning duct systems.

Depending upon the desired purpose, dampers may be quite simple or relatively sophisticated and complex.

A simple "volume damper" is merely a duct insert with one or more internal pivoting blades whose positions are set by a lockable hand lever. Such blades are sometimes referred to as vanes or louvers.

In a more sophisticated "motorized volume damper", the blade position is controlled between an open and a closed position by a shaft rotated by an actuating motor.

In a "smoke damper", the blades are activated when smoke is detected, either within the duct or at some remote location. Typically, the blade actuator motor is activated by a smoke detector to tightly close the blades for minimum leakage. Locking devices are provided to ensure that when in the closed position, the blades will not open without manual intervention, generally requiring access to the inside of the damper.

A "fire damper" is one which closes to prevent flames and high temperature gases from rapidly spreading within a building. Fire dampers are required by U.S. building codes to maintain the required fire resistance ratings of walls, partitions and floors wherever they are penetrated by an air duct. A fire damper must be operable to close even when electric power has been interrupted. Typically, a meltable fuse or thermostat releases the blades so that they automatically slam shut under gravitational force or by a spring at a predetermined temperature, typically about 165° F. (74° C.). In actual practice, the flame temperatures attained may destroy the elasticity of the biasing spring, making it useless for keeping the blades shut under the overpressures experienced.

Many fire dampers are built to be ON-OFF safety devices only, and have no function in general flow control.

It is the view of some in the industry that in most instances, current fire dampers merely act to provide a brief delay in the spread of the conflagration, but any delay time, however small, is of value in reducing injury or preventing loss of life. In any case, current fire dampers rarely survive a fire.

Some dampers are designed to shut under either a smoke detector signal or the presence of high temperature. These "smoke-and-fire dampers" combine the features of both damper types.

Volume dampers with single-hinged blades are shown in U.S. Pat. No. 594,727 of Cooper, U.S. Pat. No. 2,320,007 of Otto, U.S. Pat. No. 2,360,888 of Peple, Jr., U.S. Pat. No. 2,400,044 of Hermanson, U.S. Pat. No. 3,847,210 of Wells, U.S. Pat. No. 4,592,535 of Magill et al., U.S. Pat. Nos. 4,472,999 and 4,555,981 of McCabe, U.S. Pat. No. 4,506,825 of Grant, U.S. Pat. No. 5,398,910 of Kitazawa, U.S. Pat. No. 5,921,277 of Bernal, and U.S. Pat. No. 6,019,679 of Lloyd. None of these patents shows a damper configured as a smoke damper or fire damper, with the exception of the McCabe patents and the Lloyd patent. In McCabe, a single spring biased blade is moved by a lever attached to a rotatable shaft. The lever/shaft connection is shown as a serpentine bimetallic element which when heated to a predetermined temperature, disconnects the lever from the shaft, permitting the blade to close. The damper may be used for maintaining an open position in the event of e.g. smoke detection; the spring position is altered to bias the damper blade to an open position. The damper cannot be used for opening the blade under one stimulus, i.e. smoke and closing it under another, i.e. fire, since the response depends upon the spring location. Springs installed for each action would cancel each other.

Flexible damper louvers comprising flexible tubular members expanded by internal pressure, movable rods or an engaging member are shown in U.S. Pat. No. 3,329,163 of Barker et al., U.S. Pat. No. 3,768,512 of Lahaye, and U.S. Pat. No. 5,123,435 of Blacklin et al. Practical use of the Barker et al. and Blacklin et al. inventions in a high temperature environment is difficult to envision, and the Lahaye apparatus requires a very complex control system. Furthermore, the flexible thin-skin metal or plastic vanes of Barker et al. and Lahaye will not be very resistant to fire and heat. In addition, repeated bending will lead to cracking and breakage.

U.S. Pat. No. 3,412,755 of Mason describes a pressure actuated valve for a duct wherein duct pressure closes the valve against a force exerted by springs on each side of the duct.

U.S. Pat. No. 3,847,210 of Wells discloses a gear system for simultaneously controlling three streams of gas.

U.S. Pat. No. 2,672,088 of Orr, U.S. Pat. No. 2,884,005 of Honerkamp et al., U.S. Pat. No. 3,958,605 of Nishizu et al., U.S. Pat. No. 4,457,336 of Allan et al. and U.S. Pat. No. 4,535,811 of Wood et al. appear to show dampers with hingedly interconnected blades of differing dimensions. No means for biasing the damper to an open or closed position is disclosed.

The Allan et al. and Wood et al. patents show systems where the blades fold into a framework with windows, and are actuated by a cammed drive.

In Nishizu et al., a four-member vane device with six hingepins and an internal biasing spring is used to maintain a constant airflow, regardless of upstream pressure. An external lever can be used to increase or decrease the spring tension.

In the Honerkamp et al. document, each vane device has four vane panels of unequal dimensions, and a side hinge pin of each vane device is connected to a transverse rod driven by a cam. The apparatus results in a requirement for high applied leverage forces to activate the damper.

The Orr reference describes a damper wherein four-member blade structures have side hinge pins connected to a common member which is moved transversely by a lever.

In each of the above references, the illustrated damper has various shortcomings which limit it use. Where two of the four members are substantially longer than the other members, the damper will not have a fail-safe closure, because increased upstream pressures may open the closure. This is illustrated in FIG. 1, showing a duct 200 wherein a four-member closure 204 of damper 202 has stationary hinge pin 206, drive hinge pin 208, and side pins 210, 212 as shown. When used as a fire damper, drive hinge pin 208 is driven by a spring or other biasing means 214 to close. If the damper 202 is mounted as shown with incoming gas stream 216, static gas pressure 218 against the blade members 220 may open the closed closure 204. If the damper 202 is mounted in the reverse order, i.e. for incoming gas stream 222, the static force 224 tending to open the closure 204 is much greater than the static force 226 tending to keep the closure closed. Thus, the damper 202 is not fail-safe in the event of, for example, loss of the required biasing spring force. Such might be expected in a fire.

U.S. Pat. No. 5,577,525 of Wirfel et al. discloses a damper actuator having a thermal release apparatus. Melting of a thermal fuse releases a spring for rotating a vane to a closed position.

The need for a damper which may be used as a true fail-safe smoke damper, fire damper, or combination smoke-fire damper in a variety of modes is evident.

BRIEF SUMMARY OF THE INVENTION

The invention comprises a damper apparatus including improved components of (a) damper blades (i.e. vanes) movable between a closed and an open position by linear movement, (b) apparatus for transforming rotary power to a linear movement, and (c) apparatus for closing (or alternatively opening) the blades to a fail-safe condition in a fire or intense heat. Various embodiments of the damper apparatus are described which may be installed in a duct carrying a gaseous fluid, e.g. heated or cooled air in a heating/cooling system. The damper is configured so that various devices may be readily added to convert the damper from a simple manually controlled volume damper to a tight seal damper, a motorized control damper, a smoke damper, a fire damper, or a combination smoke-and-fire damper.

The damper apparatus has a positive closing feature whereby once closed, increased upstream pressure merely increases the sealing force to prevent opening. Thus, the damper closure will remain in a default closed position even if the spring fails.

In an alternative embodiment, the damper apparatus has a positive opening feature whereby the upstream pressure serves to open and maintain the damper closure in a default open position.

In a still further embodiment, the damper apparatus has a locking feature in which, once closed, the damper blades will remain closed despite either high upstream pressure or increased downstream pressure. The closed position will be maintained even in the event of spring failure.

A vane positioner may be e.g. a handwheel or lever for manual operation, or may be motor-driven, and may be installed on either of two opposite sides of the damper where the drive shaft protrudes. The damper apparatus may be installed in the duct system so that the vane positioner is on the top, bottom, or either side of the damper apparatus.

The damper apparatus has an inner duct with open ends which are configured to match the ductwork into which the damper is installed.

Within the inner duct is a closure of one or more quadri-hinge vanes or blades, each of which has four flat or arcuate panels connected by hinge pins along four swivel axes. One hinge pin has its ends mounted to be stationary, and one of the other three movable hinge pins of each vane is actuated by a damper controller to open and close the panels of the vane. Each panel is a flat plane or slightly arcuate to produce a low resistance airfoil in the open position. The vanes are equipped with blade seals which effectively seal the vanes when closed. Each joint between vanes may be sealed by one or more sealing element attached to one or more of adjacent vanes.

In one embodiment, the central movable hinge pin is actuated longitudinally by a driver member. Typically the driver member is a slide assembly such as a linearly sliding plate. The slide plate engages a movable hinge pin of each vane, moving each vane between an open and a closed position. The slide assembly is normally spring mountedly biased to a closed panel position, but may be biased to the open position for certain applications. In one embodiment, the slide assembly sequentially and progressively moves each of a plurality of vanes to achieve very gradual opening and closing actions. Thus, smooth transition from a no flow condition to a flow condition, or from a full flow condition to a partially-closed position, is achieved. In another embodiment, a non-standard size damper may be formed with blades of different sizes, and provide an exponential flow curve (percent opening vs. percent linear actuation).

A gear shaft with a gear is rotated to linearly move the driver member. The gear shaft may be controllably rotated manually or by a motorized positioner with an electric motor for example. The positioner may be actuated by a remote controller. For example, a smoke detector may be used to actuate the positioner to e.g. direct electrical power to the motor to close the damper closure. The damper apparatus may be used as a fire damper, in which a fusible link in the inner duct, when melted, disconnects the gear from the gear shaft and the closure quickly closes under spring force. Easy replacement of the fusible link permits an intact damper apparatus to be reused following an emergency closure due to fire or intense heat.

Some of the features illustrated and described herein relate to, and are improvements to the disclosure of our prior application Ser. No. 09/352,235 filed Jul. 13, 1999, which is incorporated by reference herein.

BRIEF DESCRIPTION OF THE DRAWINGS

The invention is illustrated in the following figures, wherein the elements are not necessarily shown to scale.

FIG. 5 is a cross-sectional end view of a damper blade of the damper apparatus of the invention in a closed position, as taken along line 5—5 of FIG. 4;

FIG. 6 is a perspective end view of a damper blade seal portion of the invention;

FIG. 7 is a perspective end view of another damper blade seal portion of the invention;

FIG. 8 is a partial cross-sectional end view of two adjacent damper blades of the invention showing the interaction of seals in the closed position;

FIG. 14 is an upper view of a portion of a damper drive train in accordance with the invention;

FIG. 15 is a cross-sectional upper view of a portion of a damper drive train along the central axis of a gear and gear shaft of the invention, wherein the gear and gear shaft are motively disconnected;

FIG. 27 is a perspective view of another embodiment of a gear shaft of the invention;

FIG. 28 is a perspective view of a gear hub of the invention;

FIG. 39 is a side view of a cog key for disengaging a gear shaft and hub in a drive train of the invention;

FIG. 40 is a cross-sectional view of a cog key for disengaging the gear shaft and hub in a drive train of the invention, as taken along line 40—40 of FIG. 39;

FIG. 41 is an end view of a cog key for disengaging the gear shaft and hub in a drive train of the invention;

FIGS. 42 and 43 are cross-sectional views of a cog key for disengaging the gear shaft and hub in a drive train, as taken along lines 42—42 and 43—43, respectively of FIG. 39;

DESCRIPTION OF THE ILLUSTRATED EMBODIMENTS

Figure 1:
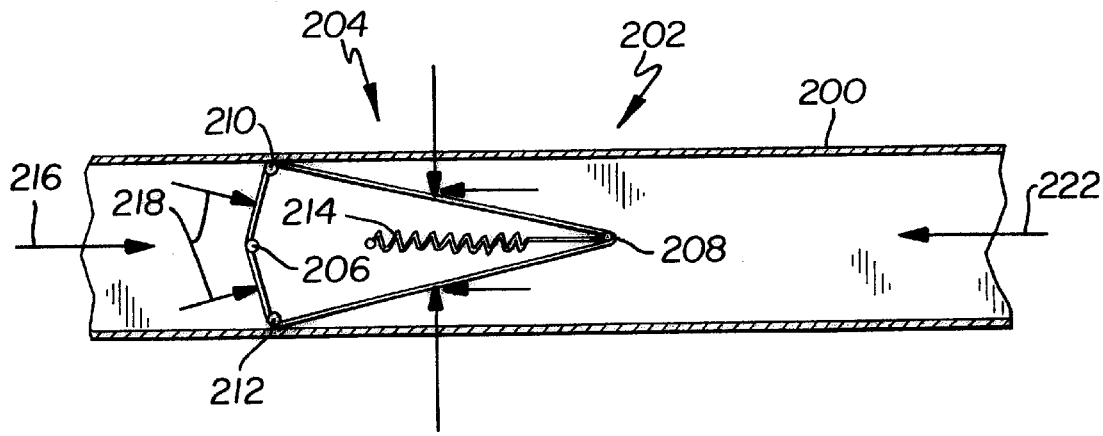
FIG. 1 is a diagrammatic cross-sectional side view of a damper of the prior art.
Figure 2:
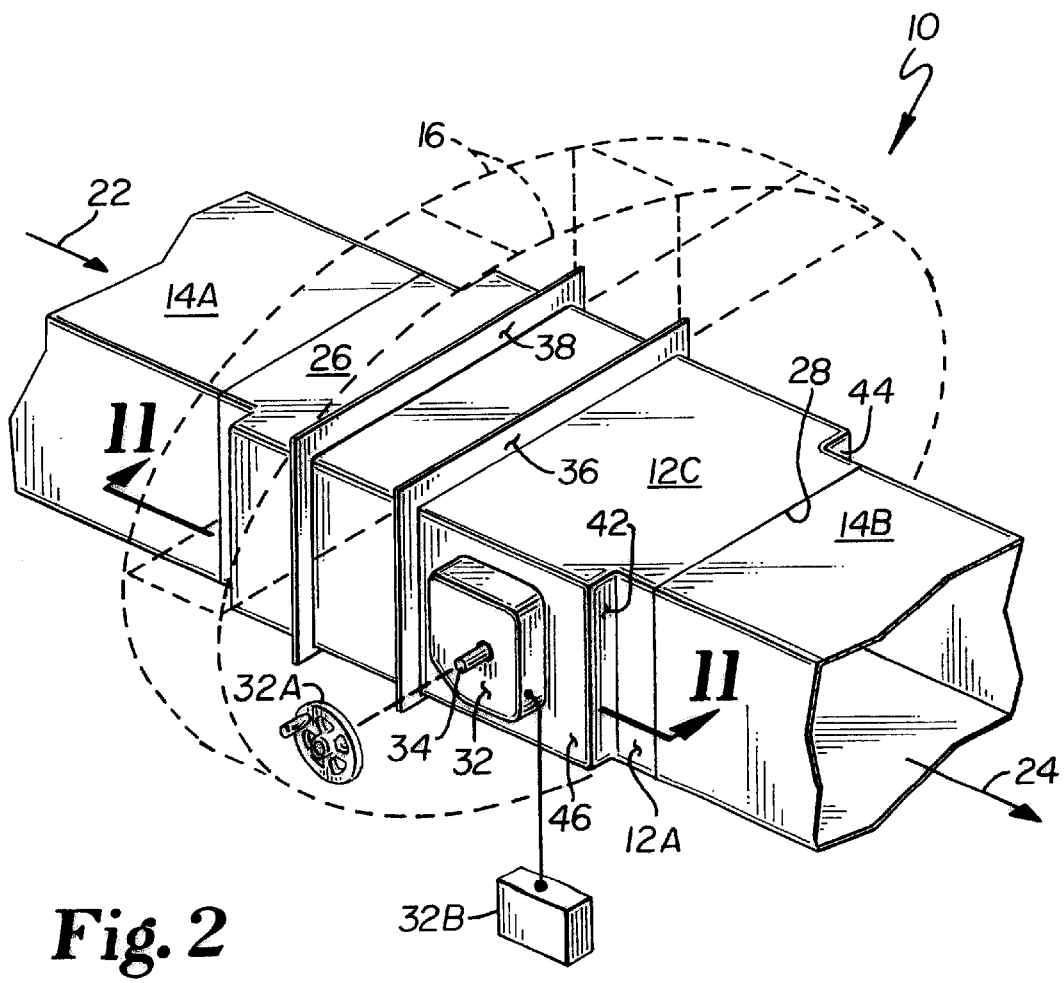
FIG. 2 is a perspective view of a damper apparatus of the invention, shown in a HVAC duct.
Figure 57:
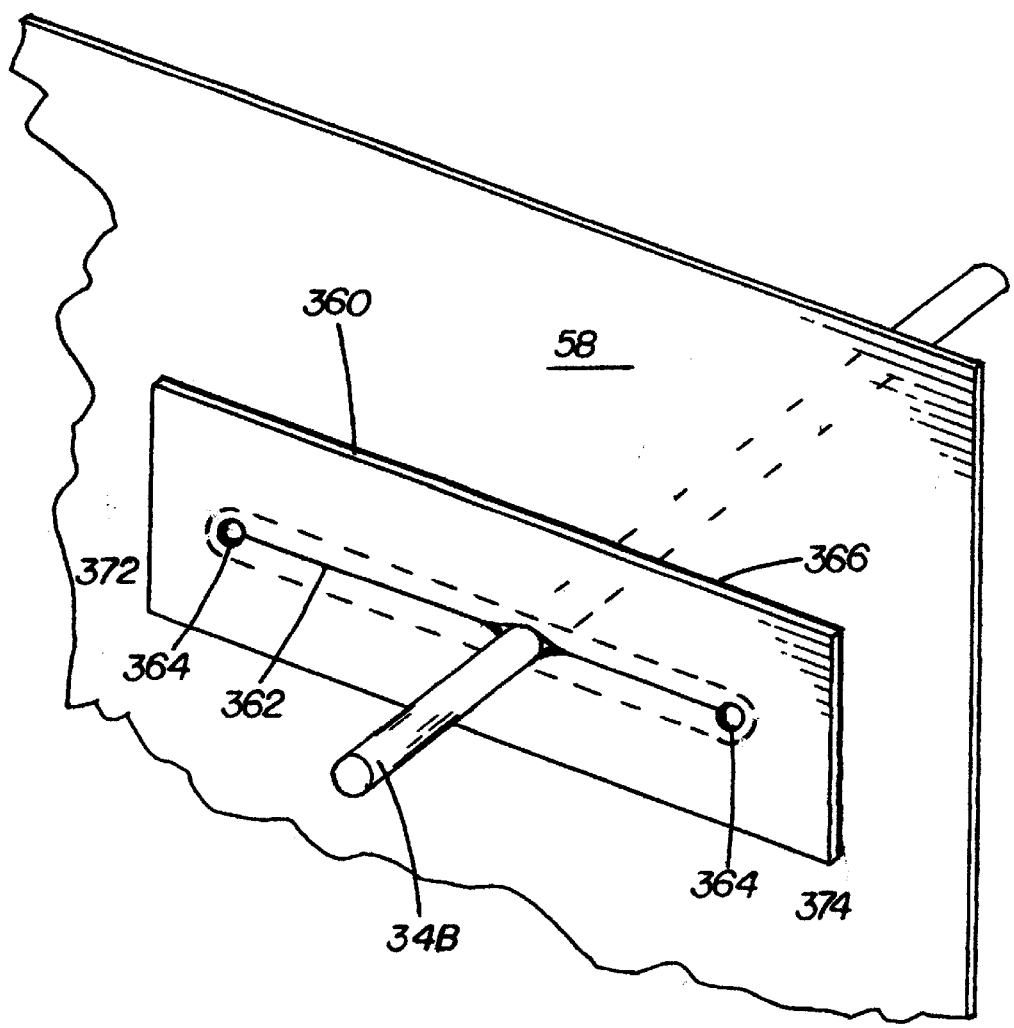
FIG. 57 is a perspective view of an elastomer friction clutch seal of the damper of the invention.

An improved fluid-flow damper 10 of the invention is described herein by reference to each of FIGS. 2 through 57. The damper 10 may be used with any gas-carrying ductwork 14A, 14B, and is particularly applicable to heating, ventilation and air conditioning (HVAC) systems of buildings and the like. The damper structure may be varied so that the apparatus may be alternatively used as:

1. a volume damper,
2. a tight seal damper,
3. a smoke damper,
4. a fire damper,
5. a combination smoke and fire damper, and/or
6. a motorized control damper combined with any of selections 1 through 5, above.

The damper 10 is configured so that standard blades of a few different sizes may be combined to accommodate a wide variety of non-standard duct sizes.

The damper 10 has structure making it particularly adapted for deterring the spread of fire and/or smoke in a conflagration, e.g. through a fire resistant wall, a floor, or other barrier.

Figure 3:
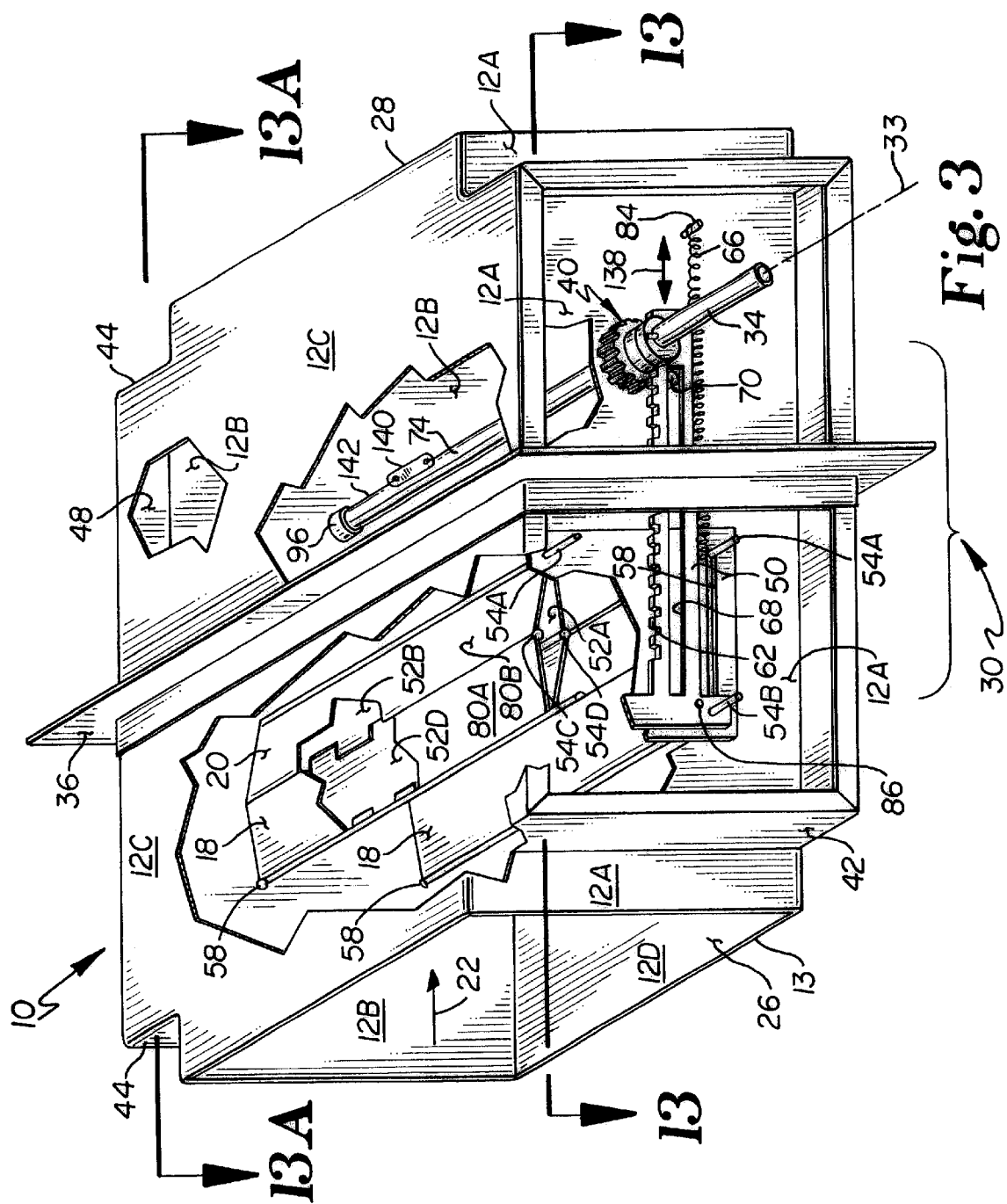
FIG. 3 is a partially cutaway perspective view of a damper apparatus of the invention.

By reference to FIGS. 2 and 3, the damper 10 includes an inner channel 13 defined by walls 12A, 12B, 12C and 12D. The damper 10 is shown with an inlet end 26 connected to an upstream duct 14A for receiving an inlet gas stream 22. An outlet end 28 is connected to a downstream duct 14B for discharge of an outlet gas stream 24. Damper ends 26, 28 may comprise any type of useful duct connection, and may be, for example, any standard duct flanges, or may comprise "flush" joints which are bent to interlock with the ducts, both types of connection being well known in the art.

The embodiment of damper 10 illustrated in FIG. 2 is configured to pass through a barrier 16 such as a fire resistant building wall or floor, for example, shown in hatched lines. A fixed flange 36 of the damper 10 and an adjustably movable flange 38 abut opposite sides of barrier 16.

Figure 13:
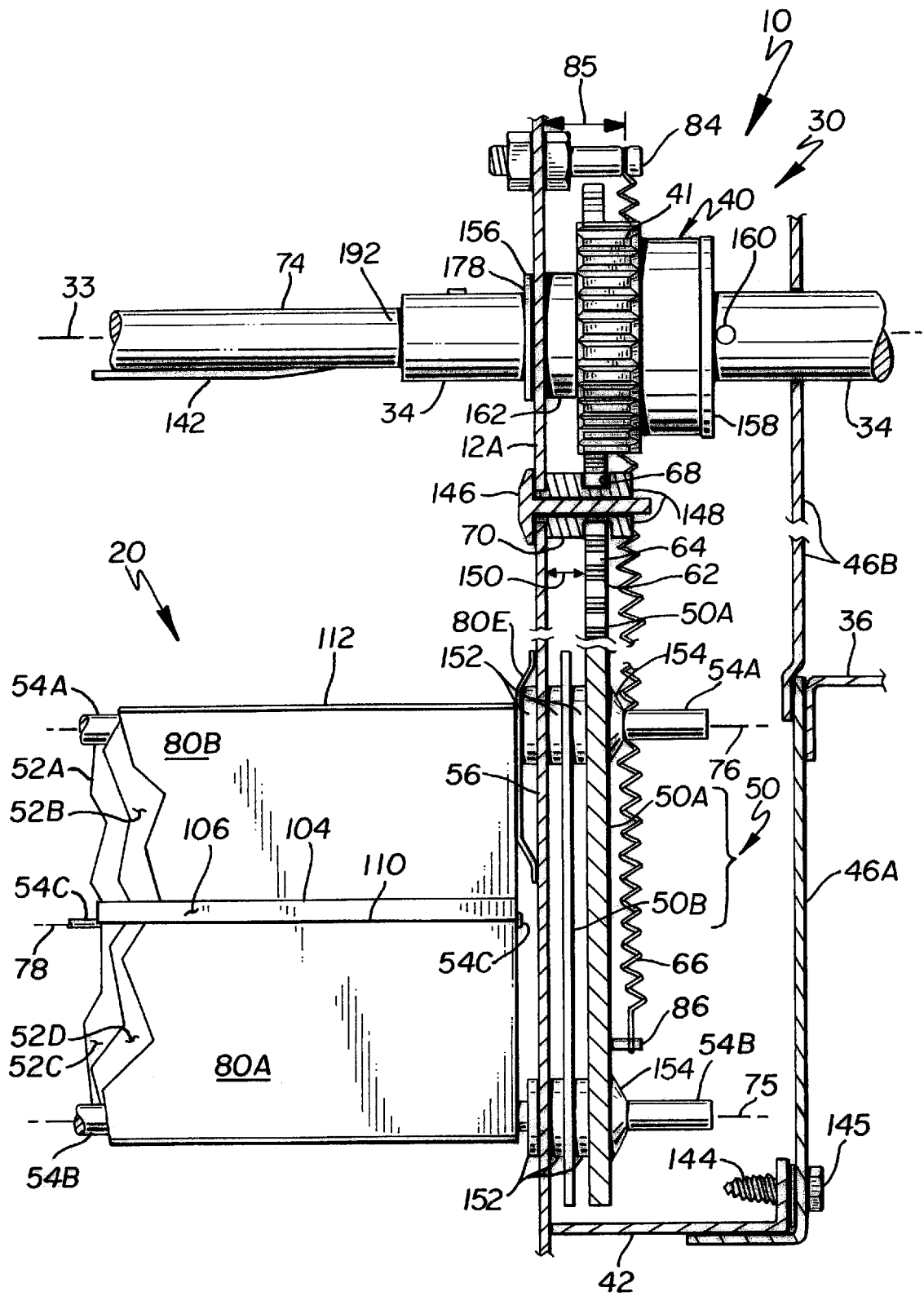
FIG. 13 is a partial upper cross-sectional view of a first damper control compartment showing the drive train of a damper of the invention, as taken along line 13—13 of FIG. 3.
Figure 13A:
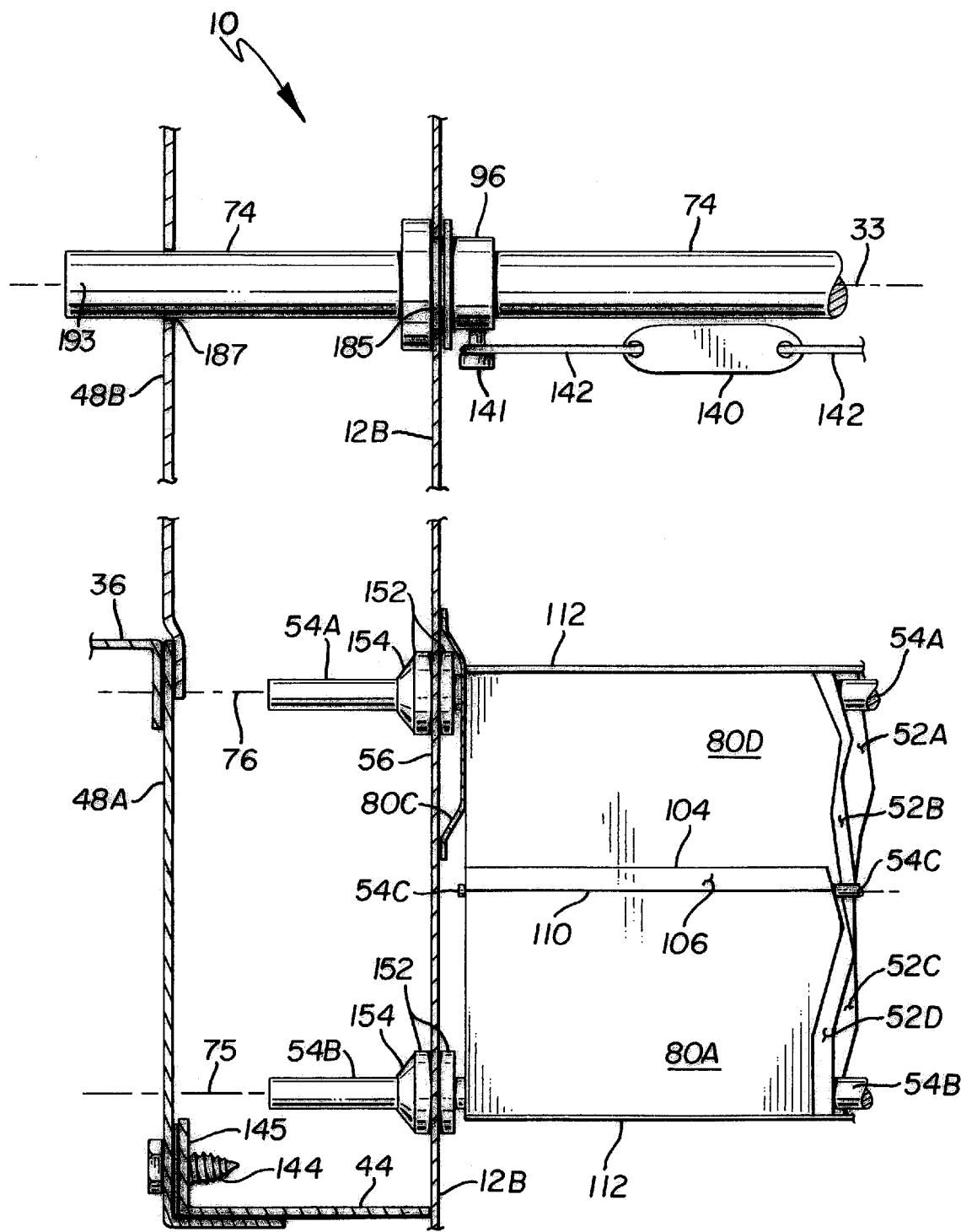
FIG. 13A is a partial upper cross-sectional view of a second damper control compartment of a damper of the invention, as taken along line 13A—13A of FIG. 3.
Figure 15A:
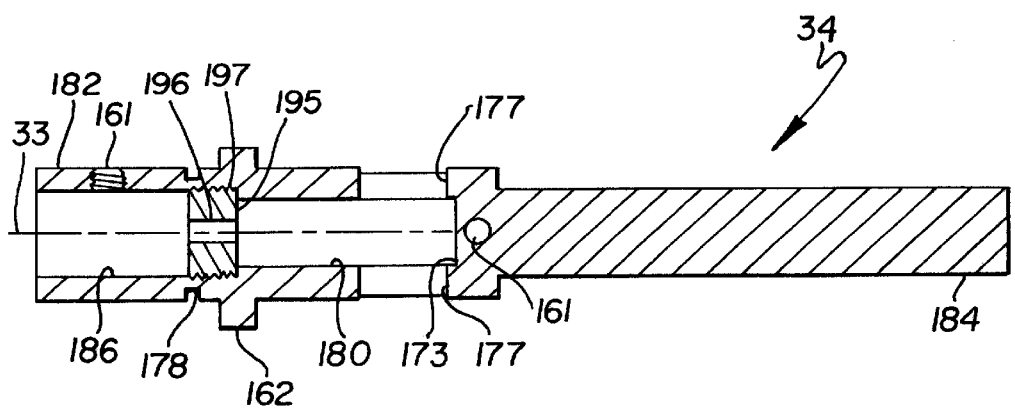
FIG. 15A is a cross-sectional upper view of another embodiment of a gear shaft of the invention.
Figure 21:
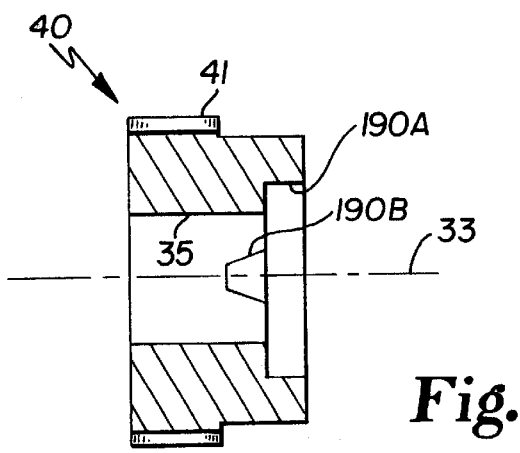
FIG. 21 is a lateral cross-sectional view of a gear of the invention, as taken along line 21—21 of FIG. 20.

Within damper 10 is a damper closure 18 comprising one or more flow control vanes or blades 20 as shown in FIG. 3. The position of blades 20 is controlled between a fully open position and a fully closed position by a drive train 30 including a gearshaft 34 passing through walls 12A and 12B. Portions of the drive train 30 are enclosed in one or both of first control compartment 42 and second control compartment 44 which extend outwardly from wall 12A and 12B, respectively, and are enclosed with covers 46, 48. As shown in FIGS. 13 and 13A, each of covers 46, 48 may comprise two separate cover portions 46A, 46B, and 48A, 48B, respectively.

Returning to FIG. 2, gearshaft 34 may be rotatively actuated manually, e.g. by an exposed hand lever or wheel, for example, or other device. A simple manually controlled damper 10 will preferably include a locking device to preset the control lever or wheel in a desired constant-flow position. Such locks are well known in the art.

Optionally, or in addition, a motorized positioner 32 may be installed for automatic actuation of the closure 18. Positioner 32 may be connected to the gearshaft 34 where the shaft protrudes from wall 12A and/or wall 12B, i.e. within a control compartment 42, 44, or on the outside of cover 46 or 48. The positioner 32 may be electrically controlled from a distant location if desired, to continuously adjust the closure position in response to some input. In addition, positioner 32 may be responsive to an emergency situation.

Operation of the closure 18 is not dependent upon gravitational force, so the damper 10 may be oriented in any position as dictated by the particular application, i.e. for gas flow in the horizontal, vertical, or sloping directions.

The drive train 30 includes (a) the gearshaft 34, (b) a gear 40 mounted on the gearshaft 34, (c) a slide assembly 50 having (d) a toothed rack 62 driven by gear 40, and to which is attached (e) a driven hinge pin 54B of (f) the closeable blade 20.

To further describe the drive train 30, and as shown particularly in FIGS. 3, 4, 5 and 6, the closure 18 comprises one or more parallel airfoil shape changing blades 20. Two blades 20 are shown in FIG. 3 in the open position. As further described in the closed position in FIGS. 4 and 5, each blade 20 includes four hinged panels 52A, 52B, 52C and 52D, each of which is connected by hinge pins 54A, 54B, 54C and 54D at hinge joints 60A, 60B, 60C, 60D along two opposing edges to two other panels. Thus, in cross-section (FIGS. 5 and 9), the panels of blade 20 form a four-sided polygon with straight or slightly outwardly arcuate sides (i.e., panels 52A, 52B, 52C, 52D) of equal or nearly equal length. The interpin distance 99 (see FIG. 5) between the stationary hinge pin 54A and the driven hinge pin 54B is at a minimum or near-minimum when the blade 20 is fully closed, and at a maximum or near-maximum when the blade is fully open.

A stationary hinge pin 54A connects panels 52A and 52B along stationary axis 76 and is mounted at one end through damper wall 12A and at the opposite end mounted through wall 12B. For the sake of simplicity, the two panels 52A, 52B will be termed "front panels" herein. Likewise, panels 52C and 52D will be termed "rear panels". However, despite these titles, it is notable that damper 10 may be configured so that fluid flow is from either of damper ends 26 or 28.

A driven hinge pin 54B connects panels 52C and 52D and has one end projecting through a linear slot 56 in damper wall 12A into the control compartment 42, where it is connected to a slide assembly 50. See FIG. 3. Slide assembly 50 has a slot 58 through which stationary hinge pin 54A passes; hinge pins 54A, 54B guide the slide assembly in linear movement. Optionally, driven hinge pin 54B may also pass through a corresponding linear slot 58 in damper wall 12B (compare FIGS. 3 and 13A). The slide assembly 50 includes a rack 62 with gearteeth 64. Rotation of gear 40 on gearshaft 34 in engagement with slide assembly 50 moves the slide assembly in a linear direction, resulting in linear movement of the driven hinge pin 54B to open or close the closure 18. The slide assembly 50 also includes a linear guide slot 68. A guide pin 70 is mounted on wall 12A near the gear 40 to slide in slot 68. The guide pin 70 is a stand-off device which guides the rack 62 of slide assembly 50 in proper axial and radial aligned engagement with gear 40. The lengths of rack 62, slot 68 and slots 56, 58 are determined by the travel required to fully open and fully close the blade(s) 20.

Figure 4:
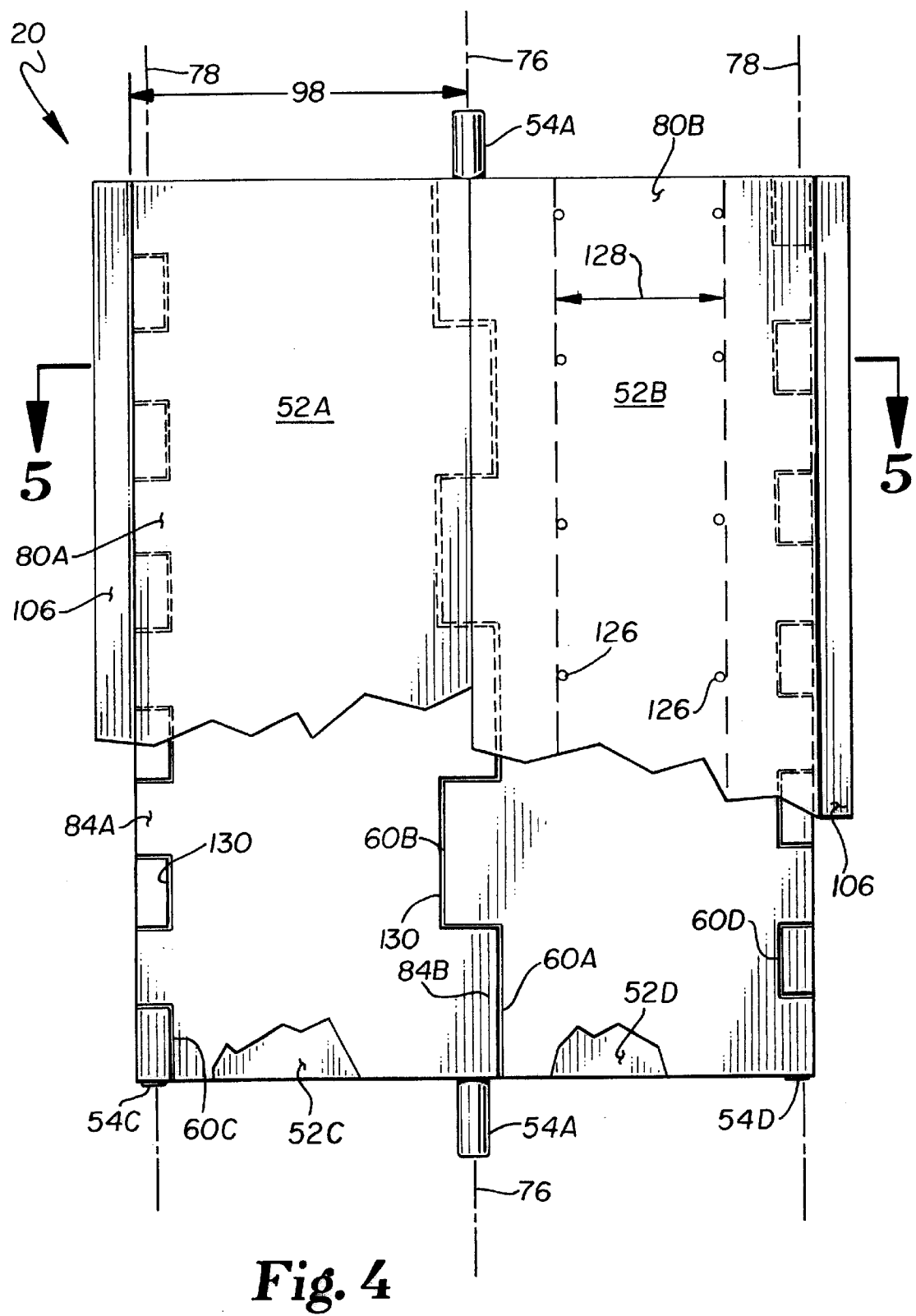
FIG. 4 is a partially cut-away top view of a damper blade of the damper apparatus of the invention.

As shown further in FIG. 4, a blade 20 (shown in the closed position) also has two floating hinge pins 54C, 54D which connect panel 52A to panel 52D, and panel 52B to panel 52C along parallel axes 78, 78.

The hinge joints 60A, 60B, 60C and 60D may be formed by notching each panel side 84A, 84B and bending the projecting (unnotched) portions in a semicircle which will enclose the appropriate hinge pin 54A, 54B, 54C or 54D. As shown in the figures, the panels 52A, 52B, 52C, and 52D may be made to be identical. Savings in time and expense will accrue, and the resulting blade 20 is symmetrical, making installation virtually foolproof.

Each panel 52A, 52B, 52C and 52D is formed of e.g. metal plate of a thickness 82 which provides a very strong blade 20 wherein exascerbated duct pressures which may be encountered under high stress conditions will not bend the panels or unfurl the hinge joints 60A, 60B, 60C or 60D. Thus, for example, panels having a drive pin travel 72 of about 5–12 inches may be formed of steel or stainless steel having a thickness 82 of about 1/16 inch.

While the blade 20 as described above will, when closed, permit only a small leakage of gas, the device may be enhanced by the application of seals to further prevent gas flow through each blade as well as in the interstices between the blade and the damper walls and adjacent blades.

In a particular feature of the invention, the exterior of each panel 52A, 52B, 52C, 52D is covered with one of seals identified by numeral 80A, 80B, 80C and 80D in alternating or other fashion. As depicted in FIGS. 4 through 8, a damper blade 20 (shown in the closed position) comprises four panels 52A, 52B, 52C and 52D, hinged together by stationary hinge pin 54A, drive hinge pin 54B (directly behind pin 54A in FIG. 4) and floating hinge pins 54C and 54D. The damper blade 20 is opened by moving the drive hinge pin 54B in direction 88, normal to blade center plane (closed) 92 and parallel to blade center plane (open) 94. Thus, the blade 20 has a cross-sectional shape of a four-sided polyhedron with corner angles 100 continuously changeable between a minimum greater than 0 degrees and a maximum less than 180 degrees. Preferably, corner angles 100 vary from greater than about 10 degrees to less than about 170 degrees. In a more preferred form, corner angles 100 vary from about 10 to about 22 degrees in the fully closed position to about 155 to about 168 degrees in the fully open position.

Seals 80A, 80B, 80C and 80D are formed of a thin flexible material, such as a sheet of spring steel having a thickness 90 of from about 0.004 inches to about 0.015 inches, for example.

Seals 80B and 80C are shown in FIG. 6 as having a generally planar section 102 comprising the major portion thereof. A seal wing 106 is formed by bending the seal 80B, 80C along line 110 parallel to first edge 104, at an angle 108 of about 30–55 degrees, and preferably about 40 to about 50 degrees. Seal wing 106 has a width 120 enabling its extension outwardly beyond the end of the blade 20 to sealingly intercept a similar wing 106 of an adjacent blade (FIG. 8), or to sealingly intercept the wall 12C or 12D of the damper channel 13. In FIG. 8, a seal wing 106C of a seal 80C on rear panel 52C interacts with a seal wing 106B of a seal 80B mounted on front panel 52B.

If desired, the interacting seals 80A, 80B may alternatively be both mounted on the front panels 52C, 52D, or alternatively on both rear panels 52A, 52B. In these configurations, the outer edges 104 of the two interacting seal wings will abut each other instead of meshing with each other.

Along second edge 114 opposite edge 104 may be formed a narrow partial crimp 112 by bending along line 116 parallel to second edge 114. Bending angle 118 may be any angle which will lift the edge 114 slightly from the panel 52A, 52B, 52C or 52D to utilize spring force of planar section 102 to ensure forcible contact between crimp 112 and the panel. Angle 118 may thus be any angle between 0 degrees and about 90 degrees, but preferably is on the order of about 5 to about 25 degrees. The width 122 of partial crimp 112 is configured to be sufficient to provide an adequate sealing force and prevent leakage.

Seals 80A, 80D cooperate with seals 80B, 80D and are shown in FIG. 7 as having a major planar section 102 and partial crimps 112 on opposing longitudinal edges 115. Seals 80A, 80D do not have a seal wing 106 extending from the blade 20.

One of seals 80A, 80B, 80C or 80D is attached to the exterior of each of blade panels 52A, 52B, 52C and 52D, typically by spot welding, although other attachment methods may be used. In a preferred embodiment, the attachment 126 is made within the generally central portion of the panel, i.e. within a central portion 128 comprising e.g. about 2/3 of the panel width 98 (see FIG. 4). This permits the central portion 128 to exert a force which retains the partial crimps 112 against the panels for proper sealing.

The ends of blades 20 may be sealed against the walls 12A, 12B by end extensions of seals 80A, 80B, 80C and 80D, or by separate seals 80E which seal only when the blades 20 are closed. In FIGS. 13 and 13A, a seal 80E is depicted mounted on stationary hinge pin 54A and biased against the blade 20 by contact with wall 12A. The seal 80E, formed of spring material like seals 80A, 80B, 80C and 80D has a cutout portion into which drive hinge pin 54B will move when the blade is in the closed position.

Figure 9:
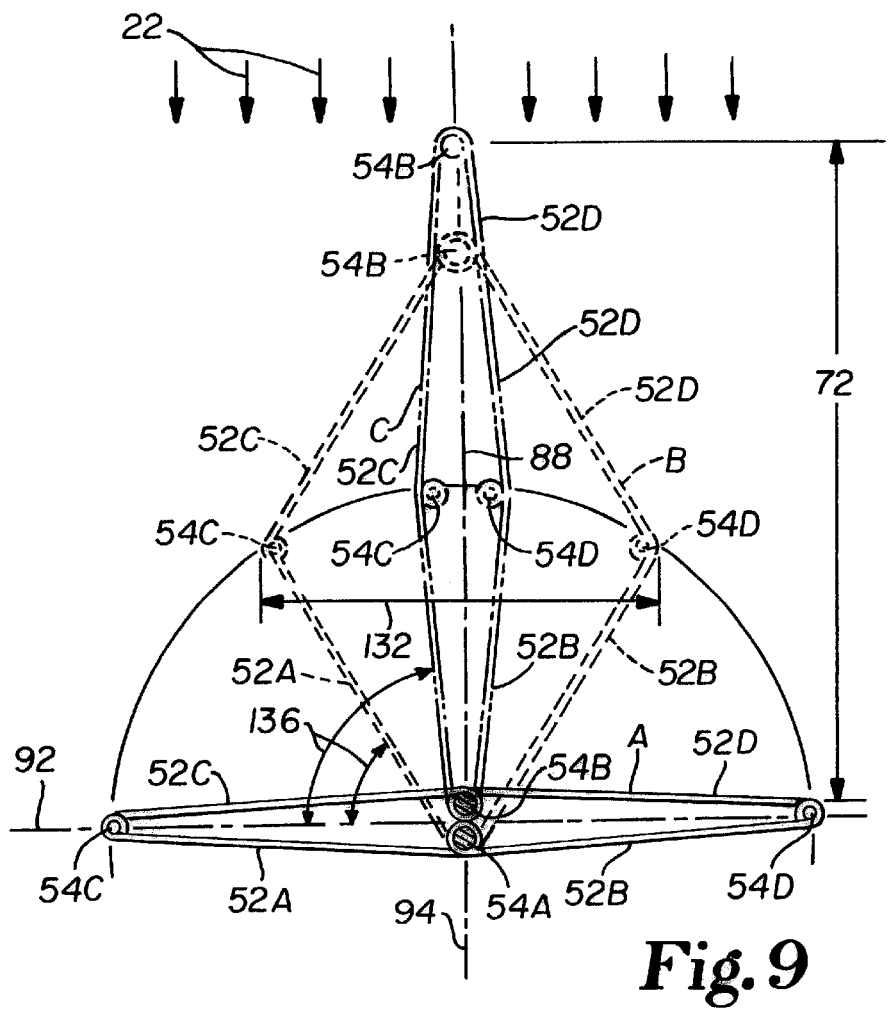
FIG. 9 is a schematic end view of a damper blade of the invention showing movement between a fully closed position and a fully open position.

It should be noted that the seals 80A, 80B, 80C, 80D and 80E are required to be effective only when the blade(s) 20 of closure 18 are in the fully closed position A of FIGS. 5, 8, and 9. Thus, when the blade 20 is in the closed position, partial crimps 112 of adjacent seals 80A and 80B closely approach each other, and cover the hinge slots 130. The same is true for adjacent seals 80C and 80D. For example, in a closed blade 20 having a panel width 98 of about 2 to 8 inches, the separation distance 124 between adjacent seals 80A and 80B may be typically less than about 1/8 inch and occurs on the hinge itself, where tolerances are very tight. Thus, very little if any leakage occurs between adjacent seals.

Figure 10:
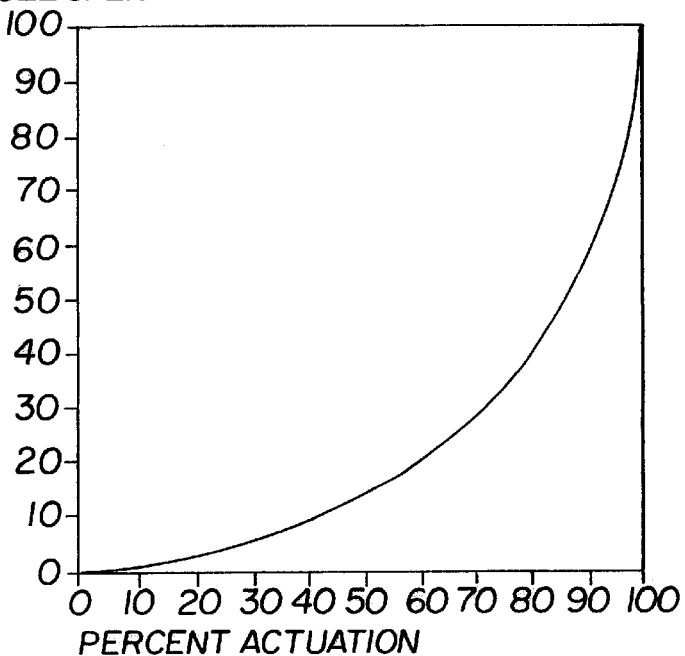
FIG. 10 is a graphical view of an exemplary relationship between the degree of actuation and the resulting gas flow area of a damper in accordance with the invention.

In FIG. 9, a blade 20 is depicted in the closed position A, in a semi-open position B, and a fully open position C. To open the blade 20, driven hinge pin 54B is moved along plane 132 by drivetrain 30, previously summarized. Floating hinge pins 54C and 54D move along circular path 134 from blade center axis (closed) 92 to approach blade center axis (open) 94. The open flow area in the damper 10 is determined as a function of blade width 132 passing through pins 54C, 54D, or the angle 136 between panels 52A, 52B and blade center axis (closed) 92, as shown by example in FIG. 10. It may be noted that the major portion of the actuation distance occurs at lower flows. Thus, for example, 60 percent of actuation opens the closure 18 only about 20 percent of full flow. This enables more precise flow control at the lower flow rates, where control is generally more difficult.

Returning now to other portions of the drive train 30 shown in FIG. 3, we see slide assembly 50 which is linearly moved in direction 138 by gear 40, and in turn moves driven hinge pins 54B in slots 56 in damper wall 12A to open and shut the damper blades 20. Slide assembly 50 may take any form attached to driven hinge pins 54B and is shown as including a toothed rack 62, a slot 58 (at least partially coextensive with slot 56) through which stationary hinge pins 54A may slide, means such as guide slot 68 through which guide pin 70 may slide for guiding slide member 50 in proper mesh with gear 40, and biasing means such as spring 66 which biases the slide assembly 50 to a default position, either closed or open. Slot 58 in the slide assembly 50 is at least partially coextensive with slot 56 in wall 12A when the slide assembly is in the open position shown in FIG. 3.

Figure 11:
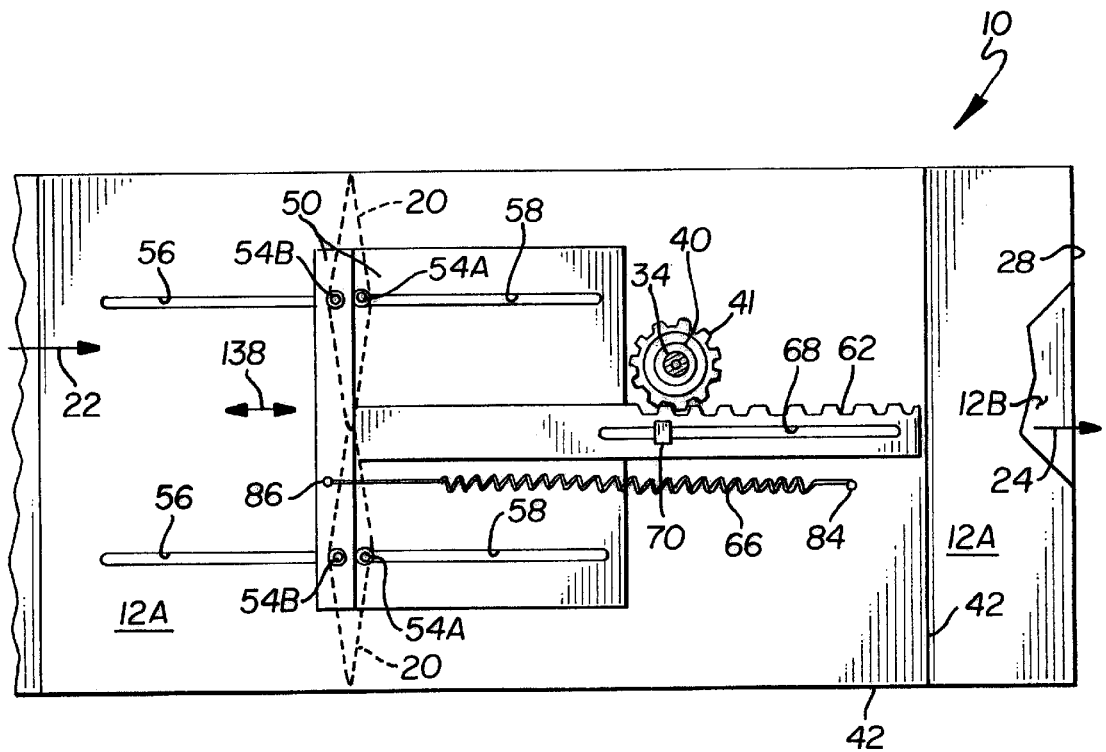
FIG. 11 is a sectional side view of a damper control compartment showing the drive train of a damper of the invention, as taken along line 11—11 of FIG. 2.

In the particular embodiment of FIGS. 3 and 11, spring 66 is attached to wall 12A by attachment 84, and to slide assembly 50 by attachment 86, to motivate slide assembly 50 to a closed default position, as shown. Thus, unless impeded by some other force (such as by the gear 40), the slide assembly will default to the closed position. It is further noted that should the spring 66 break or stretch, upstream gas pressure from gas flow 22 will also tend to close the blades 20 and maintain the blades closed. This "double default" enhances the inherent safety of this damper 10. It is evident that any pressure increase merely tightens the seal. In the embodiment of FIG. 11, slots 56 in channel walls 12A, 12B lie upstream of the stationary hinge pin 54A.

It is further noted that as shown in FIG. 13, attachment 84 may comprise a standoff which maintains the spring 66 generally parallel to wall 12A. However, the standoff distance 85 may be reduced to position the spring 66 close to wall 12A, thereby reducing the required size of attachment 84.

It is mentioned above that the damper 10 is also bidirectional with respect to fluid flow. Thus, the damper 10 shown in the figures may be reversed in the duct system so that the inlet fluid stream 22 tends to open, rather than close, the damper blades 20. This may be used when it is desired to have the damper 10 default to an open position should the spring 66 break or become non-tensile due to high temperatures.

Figure 12:
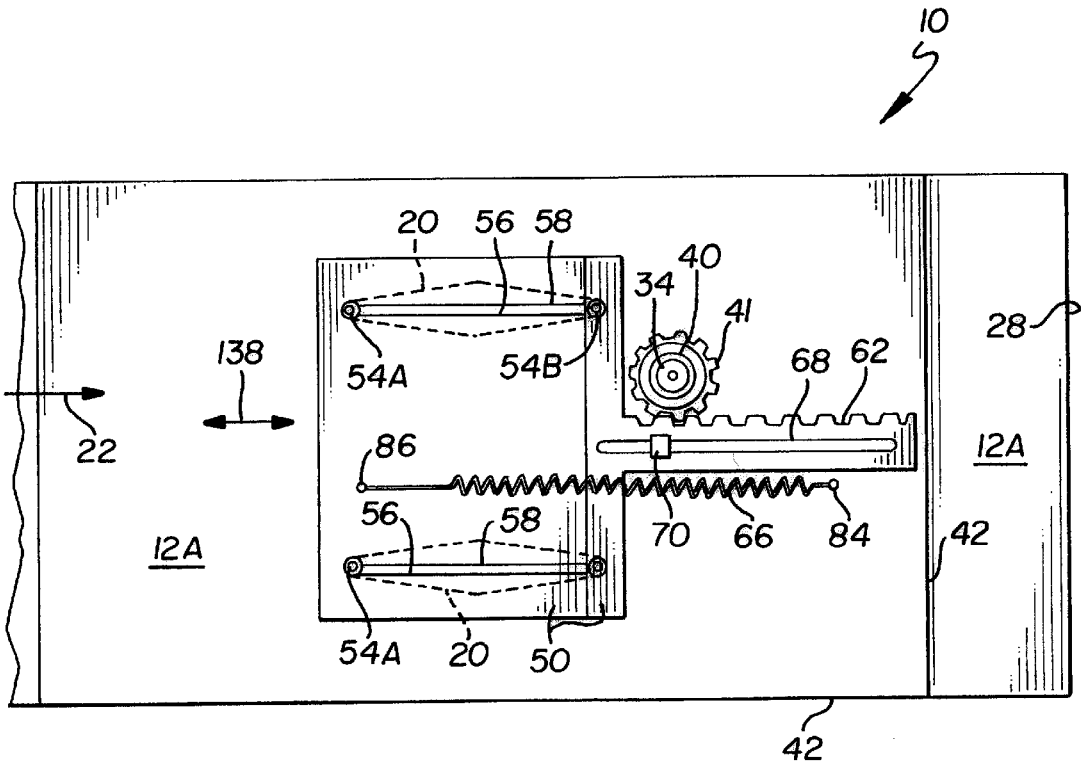
FIG. 12 is a sectional side view of a damper control compartment showing the drive train of another embodiment of damper of the invention, as taken along line 11—11 of FIG. 2.

In another embodiment shown in FIG. 12, the damper 10 is installed as shown, but the upstream hinge pin is configured as the stationary pin 54A, i.e. it is mounted in channel walls 12A, 12B to be stationary. The downstream hinge pin is configured as the driven hinge pin 54B, and moves in linear slots 56 in the channel walls 12A, 12B. In this configuration, the drive train 30 moves the driven hinge pin 54B upstream to close the damper blades 20, and slots 56 lie downstream of the stationary hinge pin 54A.

As shown in FIG. 12, the damper 10 is configured to be "double defaulted" in the open position, in that the fluid flow 22 tends to open the blades 20, and the spring 66 does as well. The upstream hinge pin of each blade 20 is installed as the stationary pin 54A, and the downstream hinge pin is attached to the slide assembly 50 and moveable thereby to open and close the blade. Furthermore, the spring 66 is installed to motivate the slide assembly 50 to the open position. Upstream pressure will open the damper 10 should the spring 66 become ineffective. Thus, the damper 10 is fail-safe in the open position.

The direction of spring force in FIG. 12 may be reversed to provide a spring default in the closed position.

Thus, it is evident that in the damper 10 of this invention, the (a) position of the driven hinge, (b) spring force direction, and (c) the direction of fluid flow may each be varied separately to obtain a variety of configurations for different applications.

The slide assembly 50 may be formed as a singular member, as by molding, for example. It may also be formed from commonly available materials such as sheet metal, metal plate, a geared rack, etc, which may be joined as by welding or with fasteners, not shown, or joined by the hinge pins 54A and/or 54B themselves. By comparing the cross-sectional view of FIG. 13 with FIG. 3, it is seen that slide assembly 50 may comprise a rack tee 50A and a linkage plate 50B. Driven hinge pin 54B is connected to the rack tee 50A and slides in linear slot 56 in damper wall 12A. The rack tee 50A has a toothed rack 62 of gear teeth 64 which communicate with teeth 41 of gear 40, the latter rotatable by gear shaft 34 about shaft rotation axis 33. The rack tee 50A is also guided by a guide pin 70 which may be a standoff mounted to wall 12A by a rivet 146 and washer 148 to maintain a desired distance 150 between the wall 12A and the rack tee. Guide pin 70 slides in guide slot 68 in the rack tee 50A and is located proximate the gear 40 in order to maintain proper contact therebetween, and to guide the rack tee 50A in a straight line.

The linkage plate 50B is shown as being generally parallel to the rack tee 50A and spaced therefrom by spacer washers 152 about hinge pins 54A and 54B. Stationary hinge pin 54A slides in slot 58 in the linkage plate 50B. Both hinge pins 54A, 54B are positioned axially to the slide assembly 50 by e.g. push nuts 154. Spacer washers 152 also separate the linkage plate 50B and the blade(s) 20 from the inner wall 12A.

With reference to FIGS. 13 and 14, the damper 10 may be used as a simple volume damper, tight seal damper or electronically actuated smoke damper, in which the damper 10 uses a gear 40 which is fixed to shaft 34. Gear shaft 34 may itself extend across the inner channel 13 to be rotatably mounted in a bearing 96. Alternatively, the gear shaft 34 may be mounted on a continuation shaft 74 which generally spans the inner channel 13, as depicted in the figures. The gear shaft 34 may be rotated by handwheel or lever, or by a powered positioner 32. Inasmuch as the rotational forces exerted on continuation shaft 74 are minimal, the diameter 180A thereof may be substantially less than the diameter 180B of gear shaft 34. Thus, the resistance to gas flow in the damper channel 13 is reduced.

For use as a fire damper or combination fire/smoke damper, the damper 10 has means for defaulting the closure 18 to either a predetermined fully closed or fully open position, irrespective of the gear position. Thus, in a fire, the closure 18 will close or open to the predetermined default condition in the presence of heat, even in the absence of electrical power. Apparatus for enabling improved use as a fire or fire/smoke damper will be described in reference to FIGS. 3 and 13 through 22.

As shown in FIGS. 15–19, gear shaft 34 extends from an outer end 184 through an opening 166 in wall 12A to an inner end 182. Shaft 34 has a flange 162 which rotatably abuts the outside of wall 12A, and an outer groove 178 in which a lock ring 156 may be installed to rotatably abut the inside of wall 12A. The inner end 182 of shaft 34 has a hollow space 186 into which continuation shaft 74 may be coaxially seated and fixed, e.g. with setscrew 164. A hollow space 188 extends inwardly from the outer end 184 of shaft 34. The end portion 192 of continuation shaft 74 has a slanted slot 194 through which disconnect cable 142 may pass. The cable further passes through a restricted hole 196 in shaft 34 into hollow space 188 and is fixed in a spring-biased cog 170. The gear 40 is configured to rotate freely about gear shaft 34 when the cog 170 is in the disconnected position shown in FIG. 15. It is axially held in place by a retainer pin 160 which passes radially through shaft 34 and abuts a spacer washer 158 mounted on shaft 34 to retain the gear 40 in place. The retainer pin 160 also acts as an outer limit to axial movement of the cog 170.

As depicted in FIGS. 15 through 22, cog 170 comprises an elongate cog body 172 movable along axis 33 within shaft chamber, i.e. hollow space 188 of gear shaft 34. The cog 170 includes crosspiece fingers 174 which radially project through opposed slots 177 in gear shaft 34 and into a divided chamber 190 radially outside of shaft passageway 35 in gear 40. The divided chamber 190 has an outer circular chamber 190A and one or more slot chambers 190B which extend inwardly from chamber 190A. The slot chambers 190B are large enough to each hold a crosspiece finger 174 in a relatively fixed position. Thus, when the fingers 174 are seated in slot chambers 190B, the gear 40 is motively connected to shaft 34. When the fingers 174 are in the outer circular chamber 190A, rotation of shaft 34 merely rotates the fingers in chamber 190A without moving the gear 40. As shown, the cog 170 is biased by spring 168 so that, without an opposite motivating force, the crosspiece fingers 174 are retained in a disconnected position relative to the gear 40.

Figure 22:
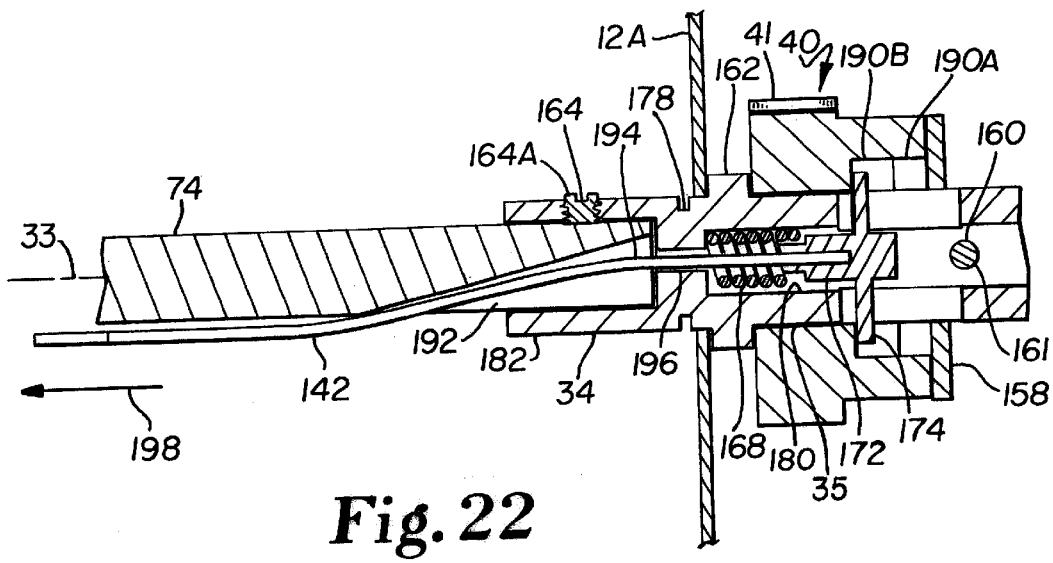
FIG. 22 is a cross-sectional upper view of a portion of a damper drive train along the central axis of a gear and gear shaft of the invention, wherein the gear and gear shaft are motively connected.
Figure 16:
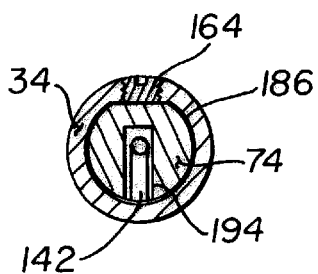
FIG. 16 is an axial cross-sectional view of a gear of the invention, as taken along line 16—16 of FIG. 14.
Figure 17:
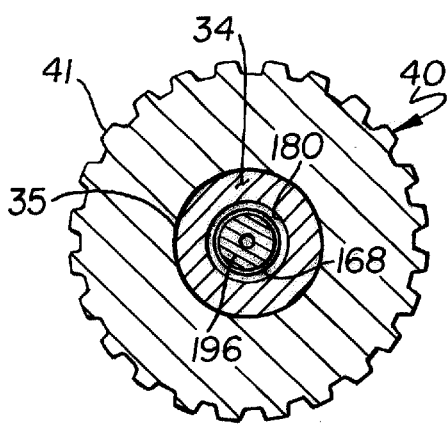
FIG. 17 is an axial cross-sectional view of a gear of the invention, as taken along line 17—17 of FIG. 14.
Figure 18:
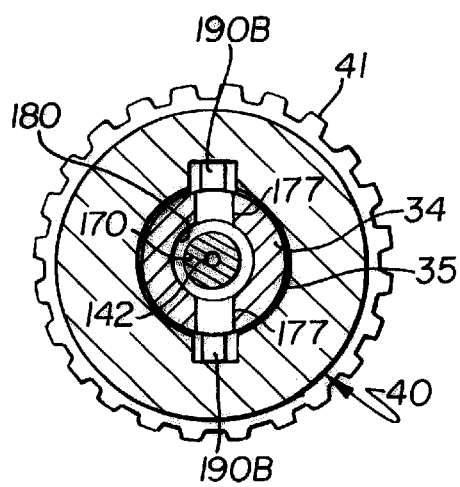
FIG. 18 is an axial cross-sectional view of a gear of the invention, as taken along line 18—18 of FIG. 14.
Figure 19:
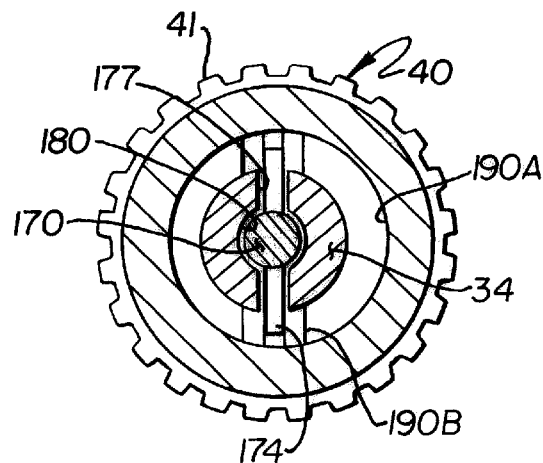
FIG. 19 is an axial cross-sectional view of a gear of the invention, as taken along line 19—19 of FIG. 14.
Figure 20:
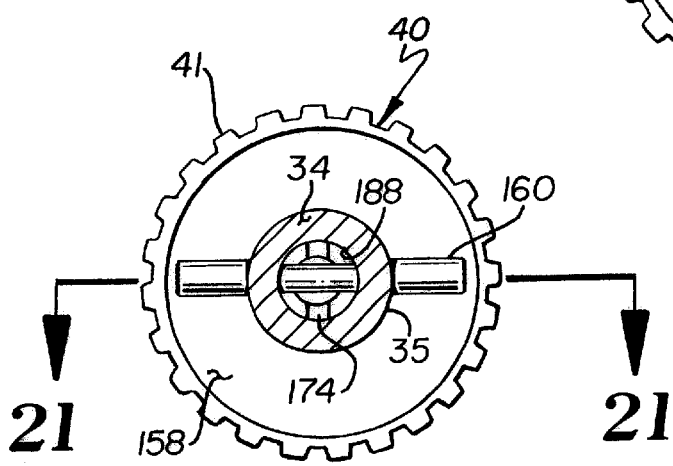
FIG. 20 is an axial cross-sectional view of a gear of the invention, as taken along line 20—20 of FIG. 14.

As depicted in FIG. 3, a fusible link 140 is connected by cable 142 to the cog 170 (see FIGS. 15, 22) by welding, for example, and to a screw or other attachment means 141 on the continuation shaft 74 (see also FIG. 13A), so that shafts 34 and 74, fusible link 140 and cable 142 rotate in common. As shown in FIG. 22, moving cable 142 in direction 198 and affixing it to maintain crosspiece fingers 174 seated in slot chambers 190B results in a drive train 30 which is motivated by rotation of gear shaft 34. Fusible links 140 as known in the art are used to disconnect apparatus in a range of preset temperatures. When a fusible link 140 is melted, it releases the disconnect cable 142 allowing spring 168 to disengage fingers 174 from the slot chambers 190B.

Thus, for example, a fusible link 140 which melts at 135 degrees F. will disconnect the gear 40 from the gear shaft 34, and may be used to automatically fully shut (or optionally fully open) the spring-biased blades 20 at that temperature, overriding the gear setting and independent of possible electrical power loss.

In a broad sense of the invention, the default position of the blades 20 need not be just "fully closed" or "fully open" but in fact may be any intermediate position as well, by limiting the drive pin travel 72 under disengagement conditions. This may be easily accomplished by limiting the lengths of slots 56, 58.

As shown in the views of FIGS. 3, 13 and 13A, the slide assembly 50, gear 40, and spring 66 are all within the first control compartment 42. These parts of the drive train 30 may alternatively be installed (as a mirror image) in the second control compartment 44 on the opposite side of the damper channel 13. In use, compartments 42 and 44 have covers 46, 48, respectively (see also FIG. 2). In one form of the invention, covers 46 and/or 48 may be subdivided into several cover portions, e.g. 46A, 46B or 48A, 48B. Thus, for example, the portions of compartments 42 and 44 installed within a fireproof barrier 16 may have fixed covers 46A, 48A and the remainders of the compartments have covers 46B, 48B which are removable for access. FIG. 13 shows a fixed cover 46A attached by screws 144 and with an intervening gasket 145; an exemplary removable cover 46B is also shown. A wide variety of cover configurations may be used. Typically, gear shaft 34 passes through the cover 46 or 48 for external manual or powered actuation.

FIG. 13A shows a fixed cover 48A and a removable cover 48B. Stationary hinge pin 54A is fixedly mounted in wall 12B and driven hinge pin 54B is movably mounted in linear slot 56 in wall 12B. The continuation shaft 74 is shown as passing through a bearing 96 in hole 185 in wall 12B and further through a hole 187 in cover 48B. However, the shaft 74 may be terminated in bearing 96 or in compartment 44 if there is no need for rotating the shaft from its end 193.

The damper 10 of the present invention provides important advantages in the art, in that it enables a wide variety of configurations with minimal changes. The damper is constructed to take advantage of a four-panel quadri-hinge blade with panels of generally the same width. While the upstream panels may have a slightly different panel width 98 than the downstream panels, a difference greater than a few percent may compromise damper operation. The drive train 30 is generally narrow, taking up minimal space. The motorized positioner 32 or manual control actuator may be positioned on either side of the inner channel 13. The damper does not depend upon gravity for its action, nor is its operation hampered by mounting in any particular position. Furthermore, the damper is bi-directional to expand the options for particular applications.

Figure 23:
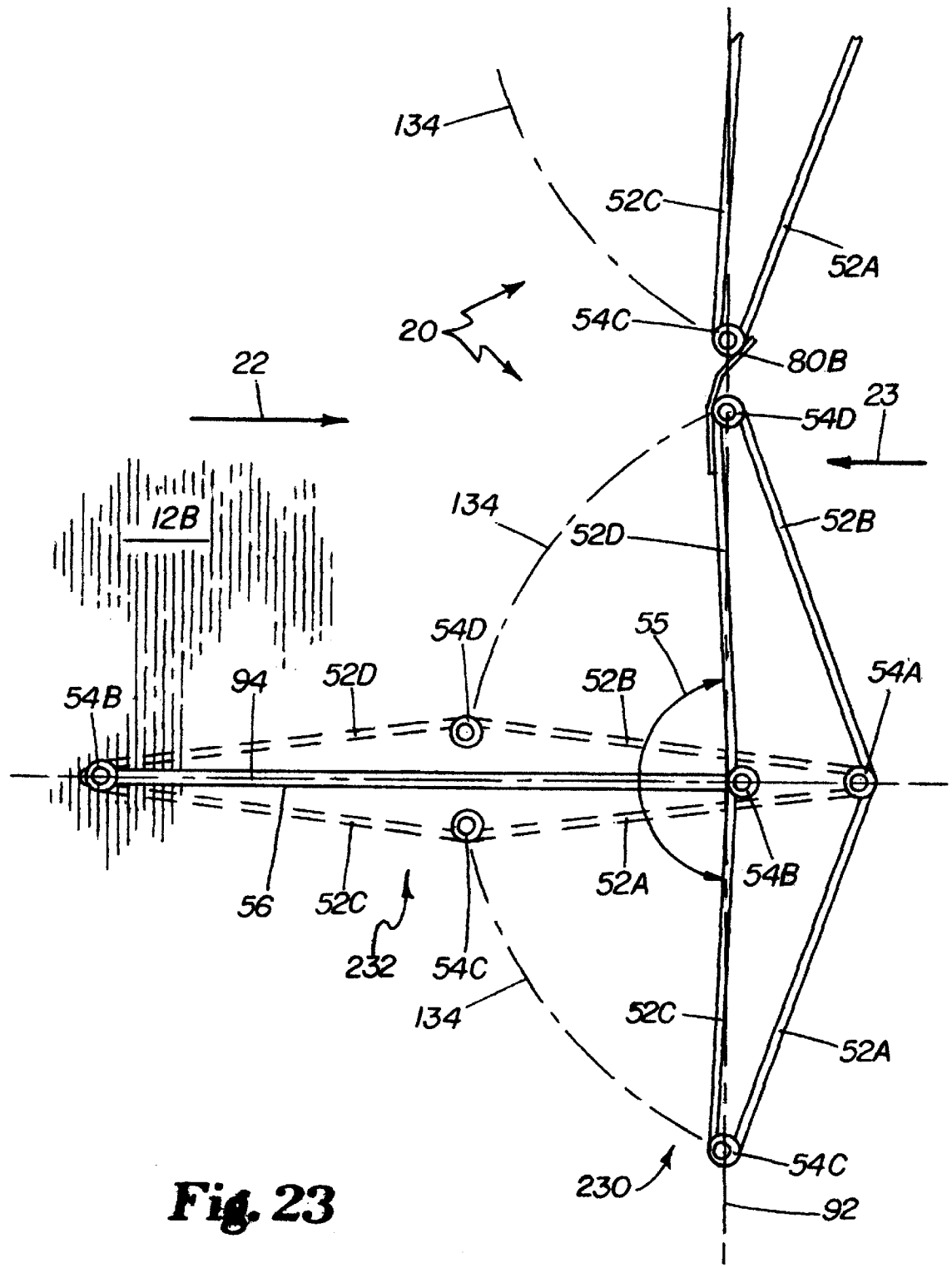
FIG. 23 is an end view of closed damper blades and inner duct wall of another embodiment of the damper of the invention.
Figure 24:
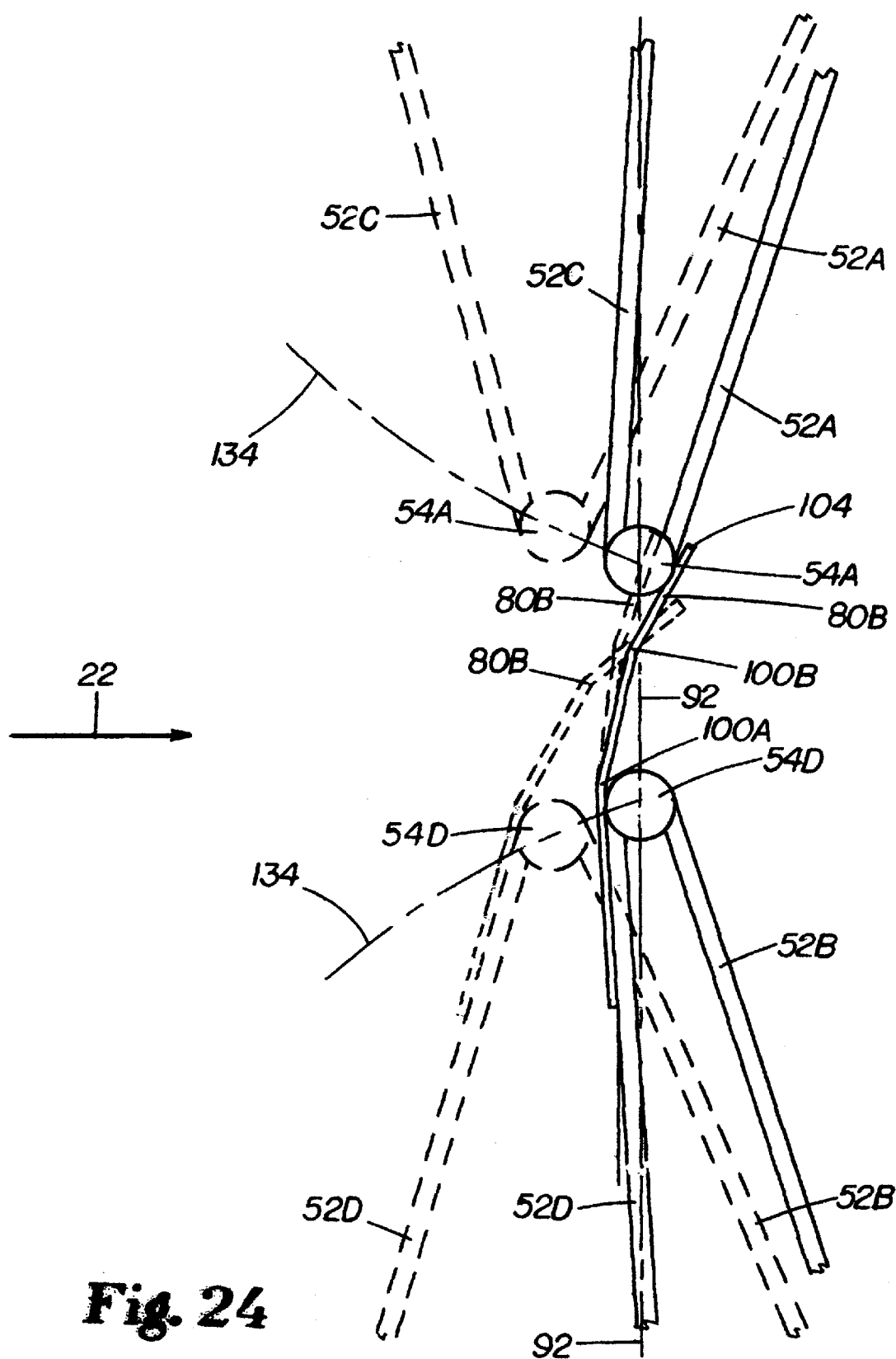
FIG. 24 is an enlarged partial end view of closed damper blades and damper seal apparatus of the damper of another embodiment of the invention.

Turning now to other variants of the invention, a self-locking damper blade configuration is shown in FIGS. 23 and 24. As shown in FIG. 23, when damper blades 20 are in a closed position denoted by the numeral 230, the angle 55 between panels 52C and 52D is less than 180 degrees by a margin of up to about 15 degrees or more. Preferably, angle 55 is about 4–10 degrees. In other words, movable hinge pin 54B lies inside of the line between the floating hinge pins 54C and 54D, being enabled by the drive pin slot 56 in the damper wall and the travel of the rack tee 50A (not shown). As shown, panels 52C and 52D are preferably slightly shorter than panels 52A and 52B.

In this embodiment, an inlet fluid stream 22 will maintain the blade 20 in a closed position 230. Furthermore, an increase in downstream pressure by fluid stream 23 in the opposite direction will also act to maintain a closed blade 20, inasmuch as pressure on panels 52A and 52B by stream 23 will result in compressive force on panels 52C, 52D to maintain drive pin 54B in the fully closed position. Actuation of the drive pin 54B by the slide assembly 50 (shown in other views) is required to unlock the closed blade 20, moving it toward an open position 232. As already depicted in FIG. 11, a spring 66 will move the slide assembly 50 together with blades 20 to a default closed position 230, or alternatively, to a default open position 232, in the event of fire or high gas temperature, or other event which disengages the drive motor from the slide assembly.

Also shown in FIG. 23 are blade seals 80B which block off the space between adjacent blades 20. Each blade seal 80A, 80B is attached to or is an extension of a panel 52 adjacent one of the floating hinge pins 54A, 54D. The blade seal 80B is preferably formed of a thin layer of flexible material such as spring steel having sufficient strength to resist possible high pressures within the damper 10.

As depicted in FIG. 24, the blade seal 80B is preferably formed with at least one, and preferably two folds or bends 100A, 100B, and is configured to approach, contact and compressively seal against the opposite side of the next blade 20. Thus, a seal 80B mounted on an upstream panel 52D will compressively seal against downstream panel 52A of another blade 20.

Figure 25:
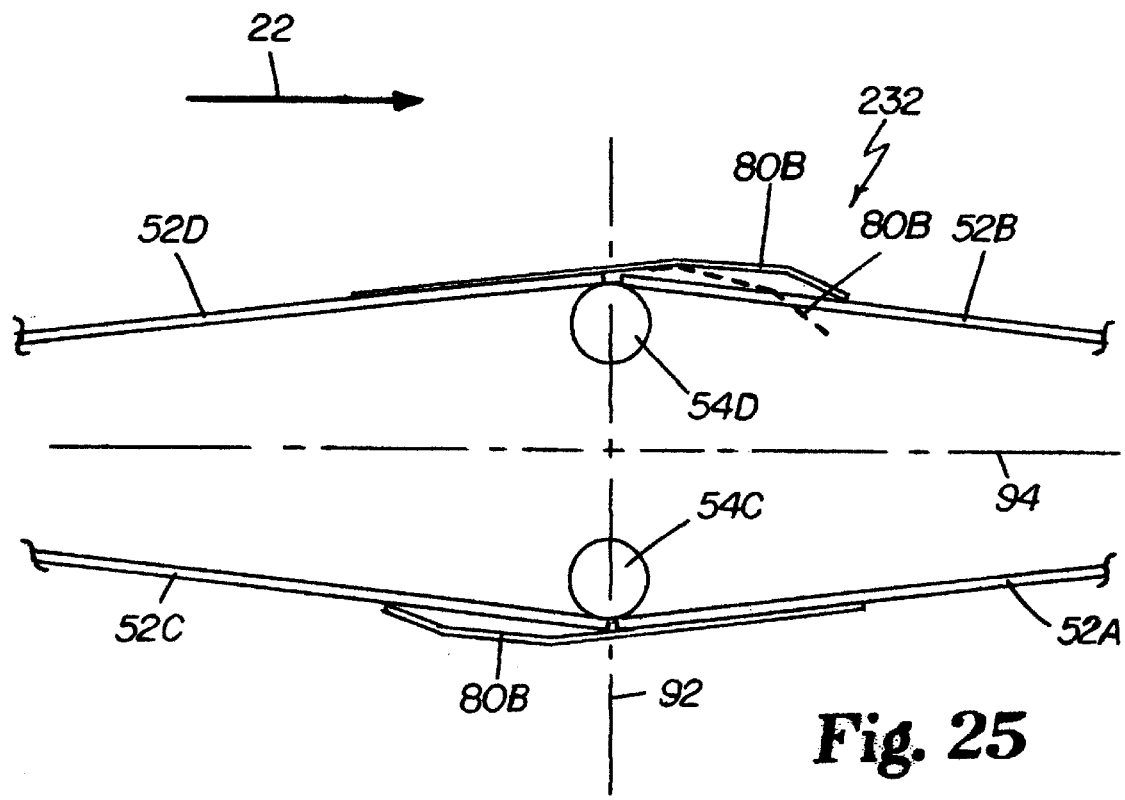
FIG. 25 is an enlarged partial end view of open damper blades and damper seals of another embodiment of a damper of the invention.

As shown in FIG. 25, when the blade 20 is moving to an open position 232, the seals 80B are compressed by blade movement from a non-compressed state shown by a hatched line to a compressed state. The compression is in the opposite direction from the blade closing action shown in FIG. 24.

Figure 26:
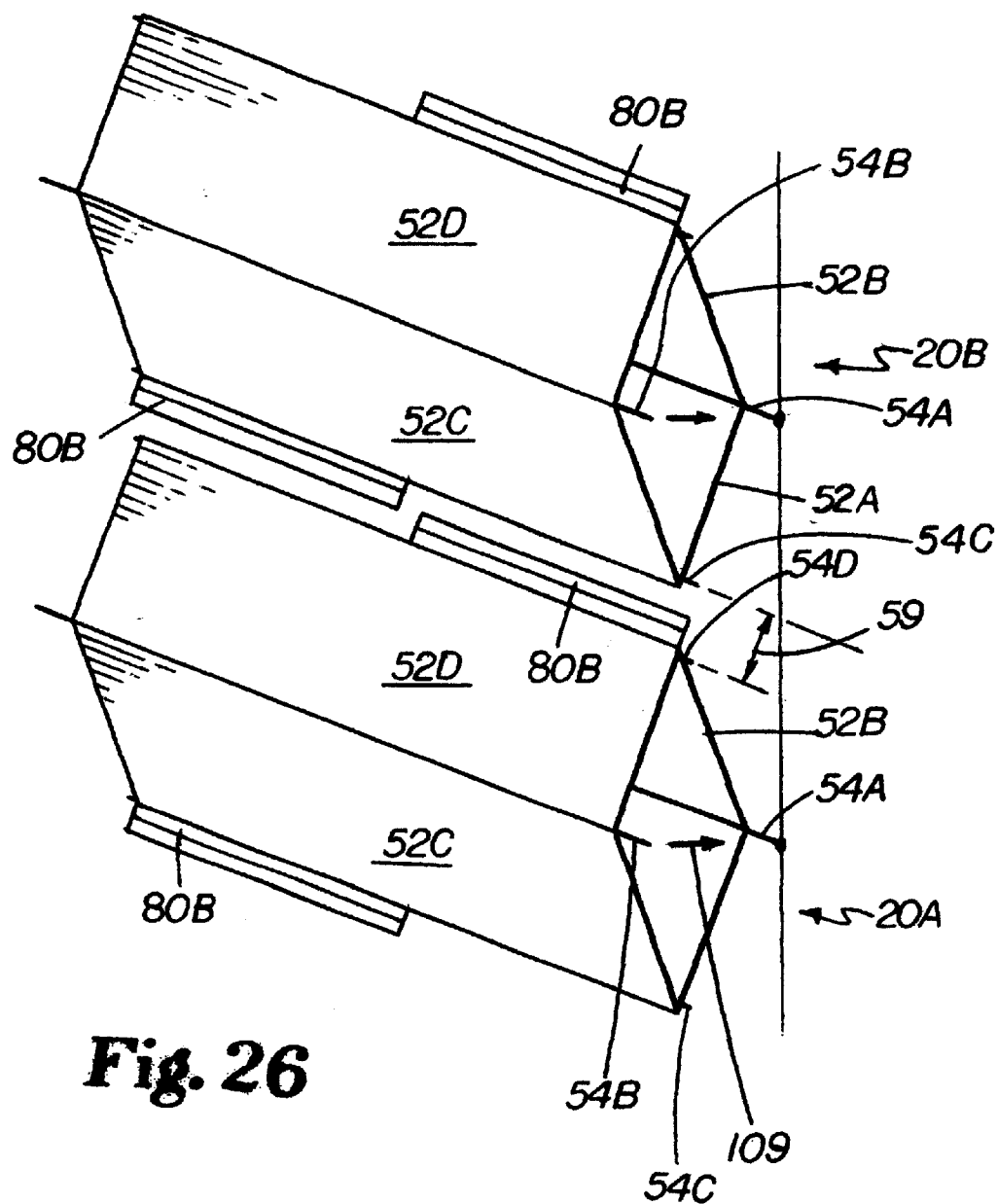
FIG. 26 is a perspective view of partially closed damper blades with split damper seals, in accordance with a damper of the invention.

While each seal 80B may extend across an entire blade 20, more balanced seal forces result from splitting the seal along an opening between blades, such as shown in FIG. 26. In this example, a portion of an opening between blades is spanned by one seal 80B attached to panel of the lower blade 20A, and the remaining portion is sealed by a second seal attached to panel of the upper blade 20B. As a drive pin 54B is moved in direction 109, the interpin distance 59 between pin 54A of blade 20A and pin 54C of blade 20B is narrowed. A first seal 80B mounted on panel 52D of the lower blade 20A becomes compressingly sealed against panel 52A of upper blade 20B. Likewise, a second seal 80B mounted on panel 52C of the upper blade 20B becomes sealed against panel 52B of the lower blade 20A. Seals 80B between blades and interior camper walls 12 may be mounted similarly.

Figure 34:
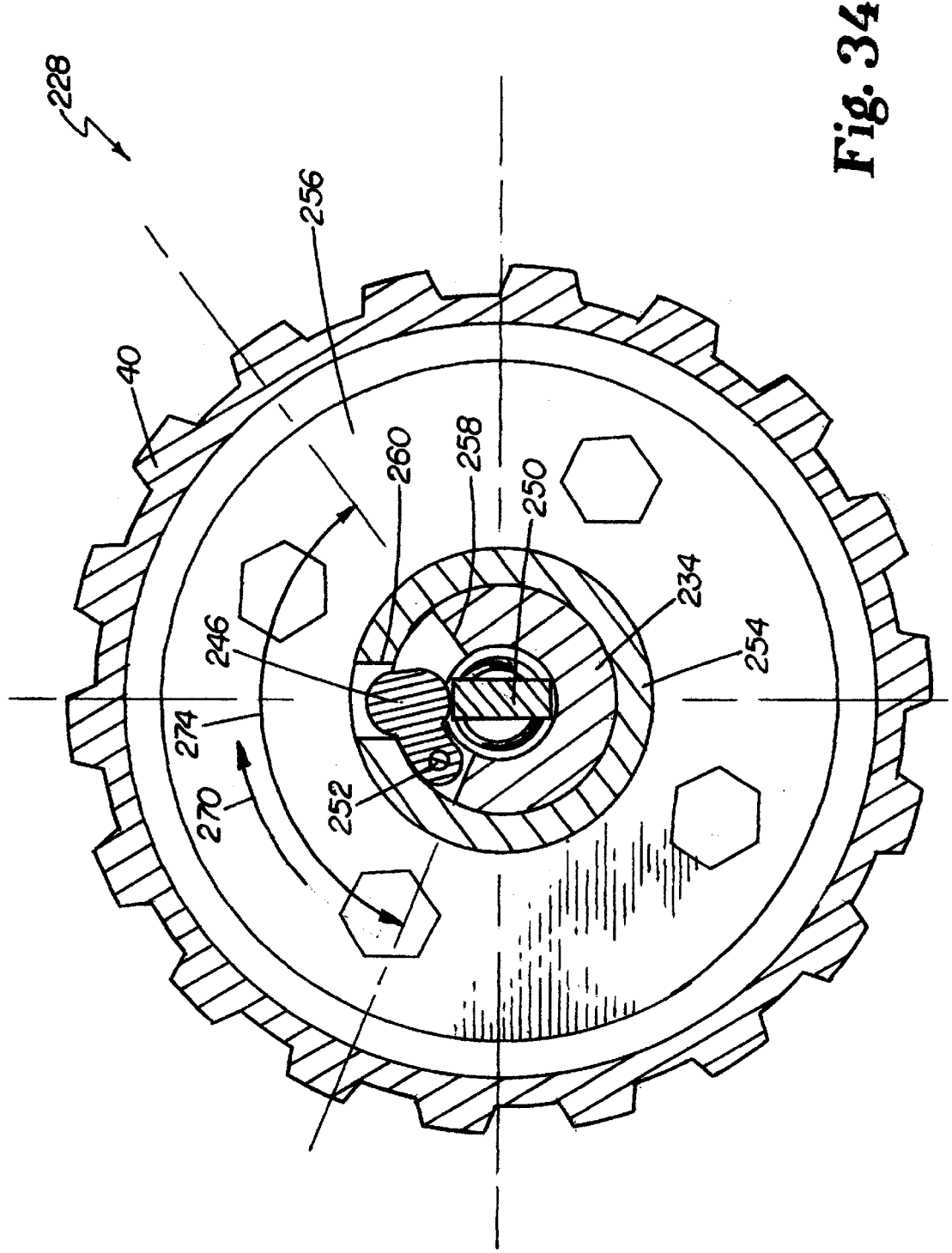
FIG. 34 is a cross-sectional view of a gear shaft and hub in accordance with the invention, as taken along line 34—34 of FIG. 29.
Figure 35:
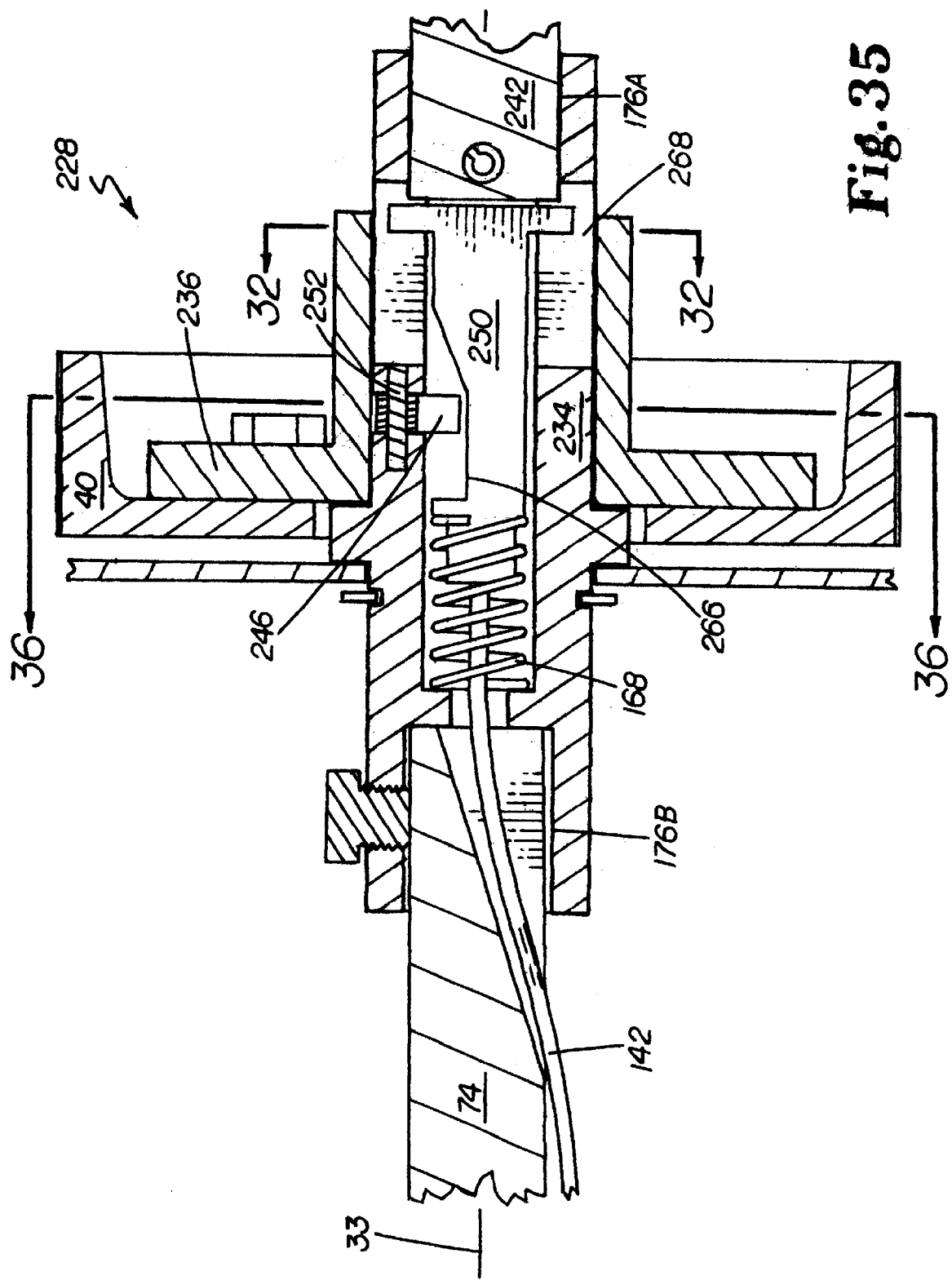
FIG. 35 is a side cross-sectional view of an embodiment of a gear shaft and hub of a drive train in a disengaged position in accordance with the invention.
Figure 36:
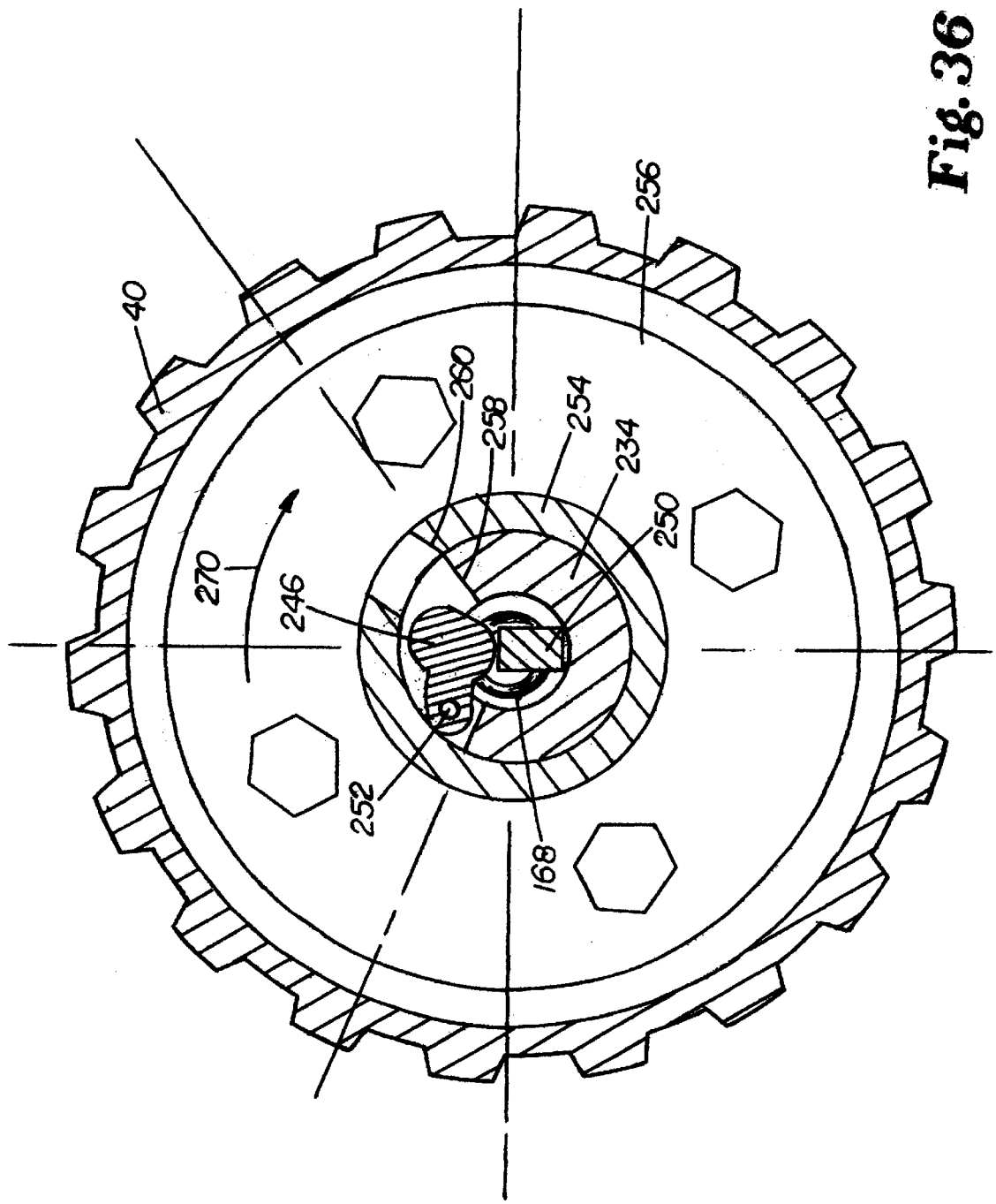
FIG. 36 is a cross-sectional view of a gear shaft and hub in accordance with the invention, as taken along line 36—36 of FIG. 35.

In another damper apparatus of this invention, illustrated in FIGS. 29, 30, 31, 32, 33, 34, 35, 36 and 36A, a disengagement apparatus 228 links a motor shaft 242 to a gear 40 driving the slide assembly 50. Disengagement apparatus 228 includes a hollow gear shaft 234 with a first end 238, a second end 240 and an intermediate stop flange 162. A hub 236 has an axial portion 254 and a radial portion 256, and is configured to be rotatably mounted on the gear shaft 234. The hub 236 is configured for attachment of a gear 40 to the radial portion 256. The gear shaft has a circumferential cog opening 258 which may be rotatably positioned in line with cog opening 260 in the hub 236. As shown in FIG. 34, cog opening 258 has a circumferential angle 274 which is sufficient to hold a pivoting cog 246 and permit it to move from an engagement position to a disengagement position. For example, in a typical disengagement apparatus, the radial angle 274 may generally be about 100–130 degrees. However, angle 274 may be greater, or less than this range.

As shown in FIGS. 29 and 34–36, a cog 246 is shown as generally having a radius arm shape. In an engaged position, the cog 246 passes outwardly through cog opening 258 to releasably engage opening 260 in the hub 236 so that rotation of the gear shaft 234 drives the hub 236 and attached gear 40. The cog 246 is rotatably mounted on an axial cog pin 252 in a hole in the gear shaft 234. When a movement-limiting key surface 264 is removed, the cog 246 pivots inwardly under the force of rotation of a rotating hub portion 254. The hub portion 254 slides over the cog, forcing it inwardly to a disengagement position. This is a fail-safe feature of this disengagement apparatus 228.

A key 250 formed of a plate material is slidably mounted in the gear shaft 234. The key has a head 250A which slides in opposed axial slots 268 in the gear shaft 234. The key 250 is spring mounted so that when resistance to movement of the key (via disconnect cable 142) is released, spring 168 pushes the key from a position in which the cog 246 is engaged by key surface 264 (FIGS. 29 and 34) to a position in which the cog is disengaged, i.e. the cog rotates to key surface 266 shown in FIGS. 35 and 36. The hub 236 and attached gear 40 then may rotate in direction 270 independent of the gear shaft 234, whereby the damper 10 may move to a designated fail-safe position.

Figure 29:
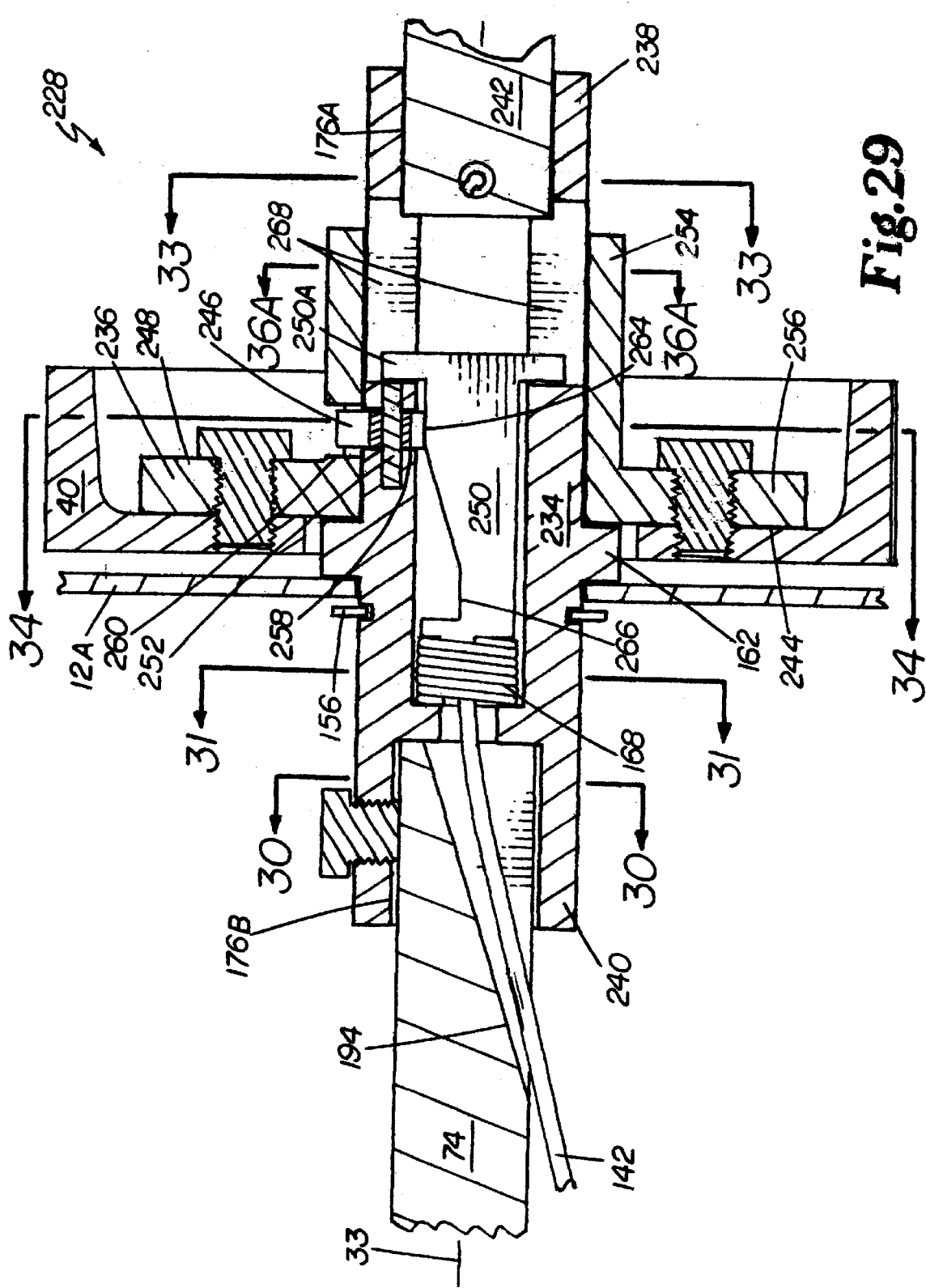
FIG. 29 is a side cross-sectional view of another embodiment of an assembled gear shaft and hub of a drive train shown in an engaged position in accordance with the invention.
Figure 30:
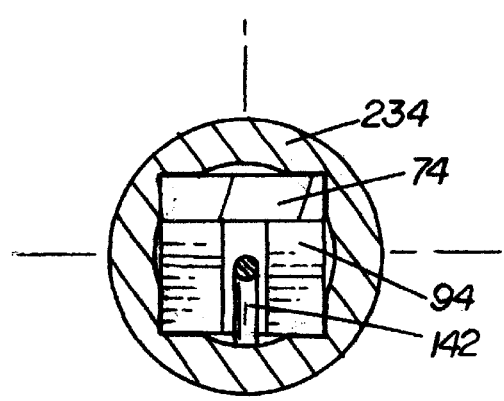
FIG. 30 is a cross-sectional view of a gear shaft and hub in accordance with the invention, as taken along line 30—30 of FIG. 29.
Figure 31:
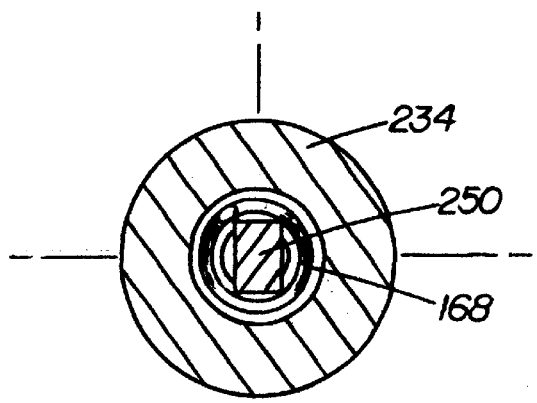
FIG. 31 is a cross-sectional view of a gear shaft and hub in accordance with the invention, as taken along line 31—31 of FIG. 29.
Figure 32:
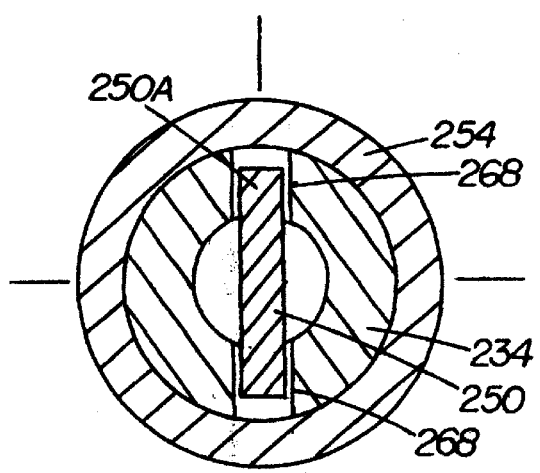
FIG. 32 is a cross-sectional view of a gear shaft and hub in accordance with the invention, as taken along line 32—32 of FIG. 35.
Figure 33:
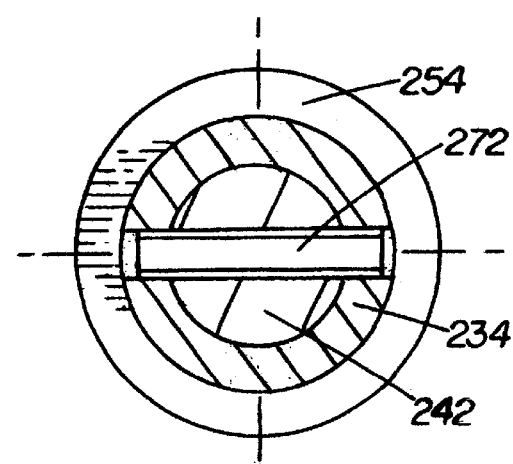
FIG. 33 is a cross-sectional view of a gear shaft and hub in accordance with the invention, as taken along line 33—33 of FIG. 29.
Figure 36A:
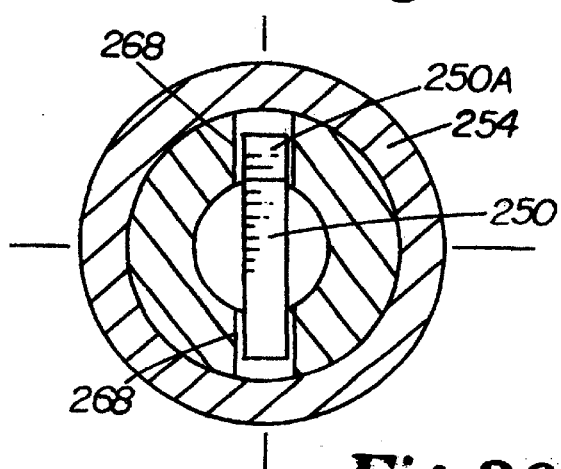
FIG. 36A is a cross-sectional view of a gear shaft and hub in accordance with the invention, as taken along line 36A—36A of FIG. 29.

As depicted in FIG. 29, a motor shaft 242 is retained in the first (i.e. exterior) end 238 by a pin 272 for example. Continuation shaft 74 is fixedly mounted in the second (i.e. interior) end 240. The gear shaft 234 is shown as passing through a channel wall 12A, and is held between the stop flange 162 and a retainer ring 156 mounted in a circumferential slot 178 in the gear shaft. In these figures, the gear 40 is shown attached to the wall-facing (i.e. interior) side 244 of the hub 236. However, in most cases it will be attached to the exterior side 248, in which case the cog opening 260 will be largely covered by the gear 40, and protected thereby.

Several versions of a drive train 30 are based on a somewhat different cylindrical gear shaft 234 shown in FIG. 27. The gear shaft 234 is depicted with a first (exterior) end 238, second (interior) end 240, and intermediate stop flange 162. The gear shaft 234 is generally hollow, and has an interior portion 278 with reduced diameter (see FIG. 37). As shown, a cog opening 258 is cut through about 100–120 degrees of the shaft 234 on the exterior side of the stop flange 162, and spaced therefrom. A set of cog pin slots 262 axially extending from each side of the cog opening 258 are configured to retain a rotatable cog pin 252 (see FIG. 37). This permits rotation of a mounted hub 236 in direction 270, i.e. right-hand rotation, to move a cog 246 downward to a disengagement position when a key is released. A second set of cog pin slots 262A enables disengagement rotation in the opposite, i.e. left-hand direction 270A if the drive train 30 is so configured. A gear shaft 234 having both sets of cog pin slots 262, 262A may be selectively used for either configuration, merely by reversing the cog orientation in the opening 258.

Gear shaft 234 is also shown with a circumferential slot or groove 178 in which a retainer ring 158 may be inserted to hold a sheet metal wall against the stop flange 162. Fastener holes 164A are shown for retaining a motor shaft 242 and a continuation shaft 74 by fasteners, e.g. screws.

FIG. 28 depicts a hub 236 which is mounted from the first end 238 of the shaft member 234 to generally abut hub stop flange 162. The hub 236 has an inside bore 284 and is configured to rotate about the shaft member 234, i.e. about central axis 33. The hub 236 has an axial portion 254 with a cog opening 260, and a radial portion 256 to which a gear may be fixed by e.g. screw holes 276. Selective positioning of a cog 246 within the cog opening 260 engages and prevents rotation of the hub 236 relative to the shaft member 234. Gears 40 of varying sizes may be attached to the radial portion 256 of hub 236, limiting the number of hub sizes required by an HVAC business to accommodate a wide range of damper sizes.

Figure 37:
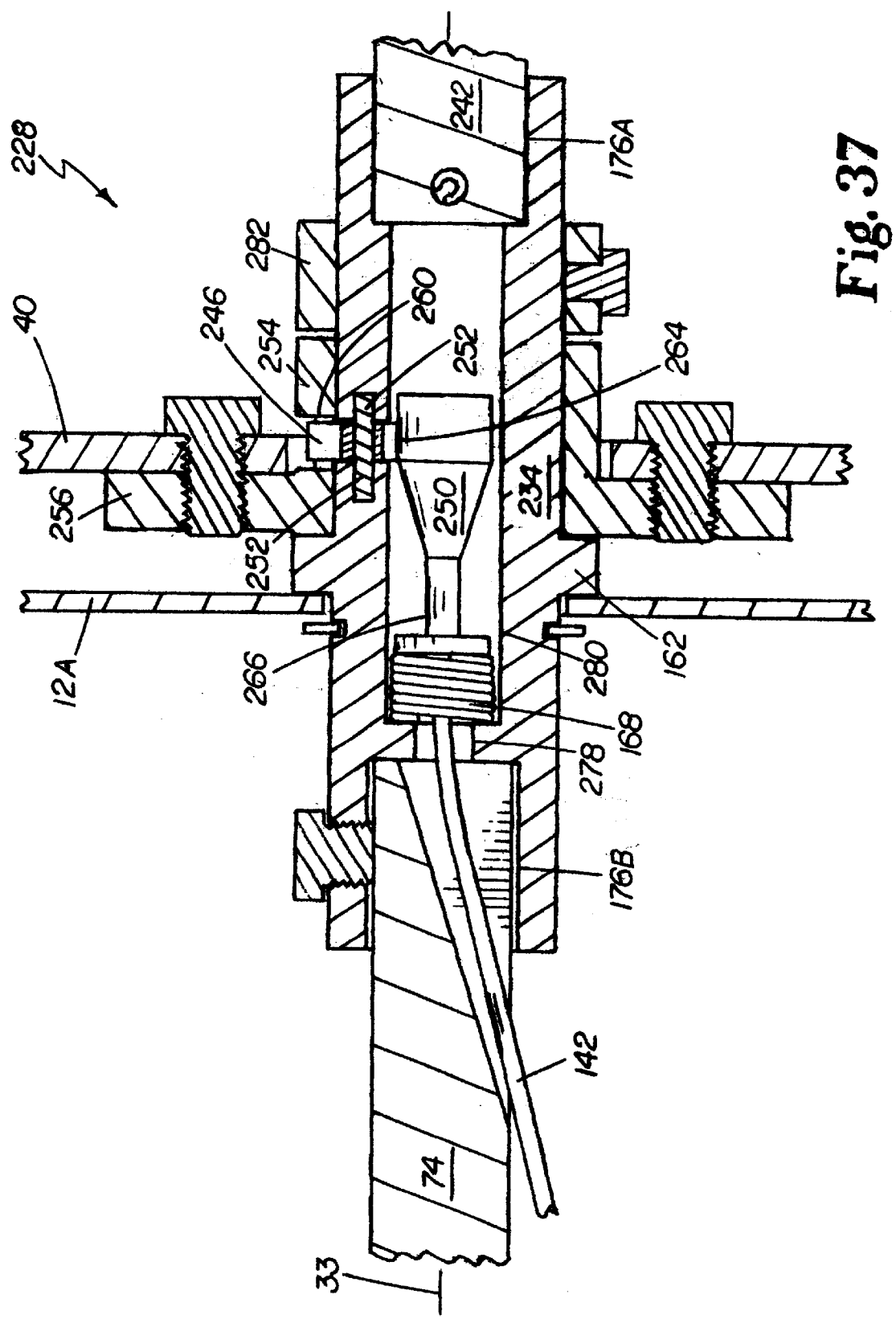
FIG. 37 is a side cross-sectional view of a further embodiment of a gear shaft and hub of a drive train in an engaged position in accordance with the invention.
Figure 38:
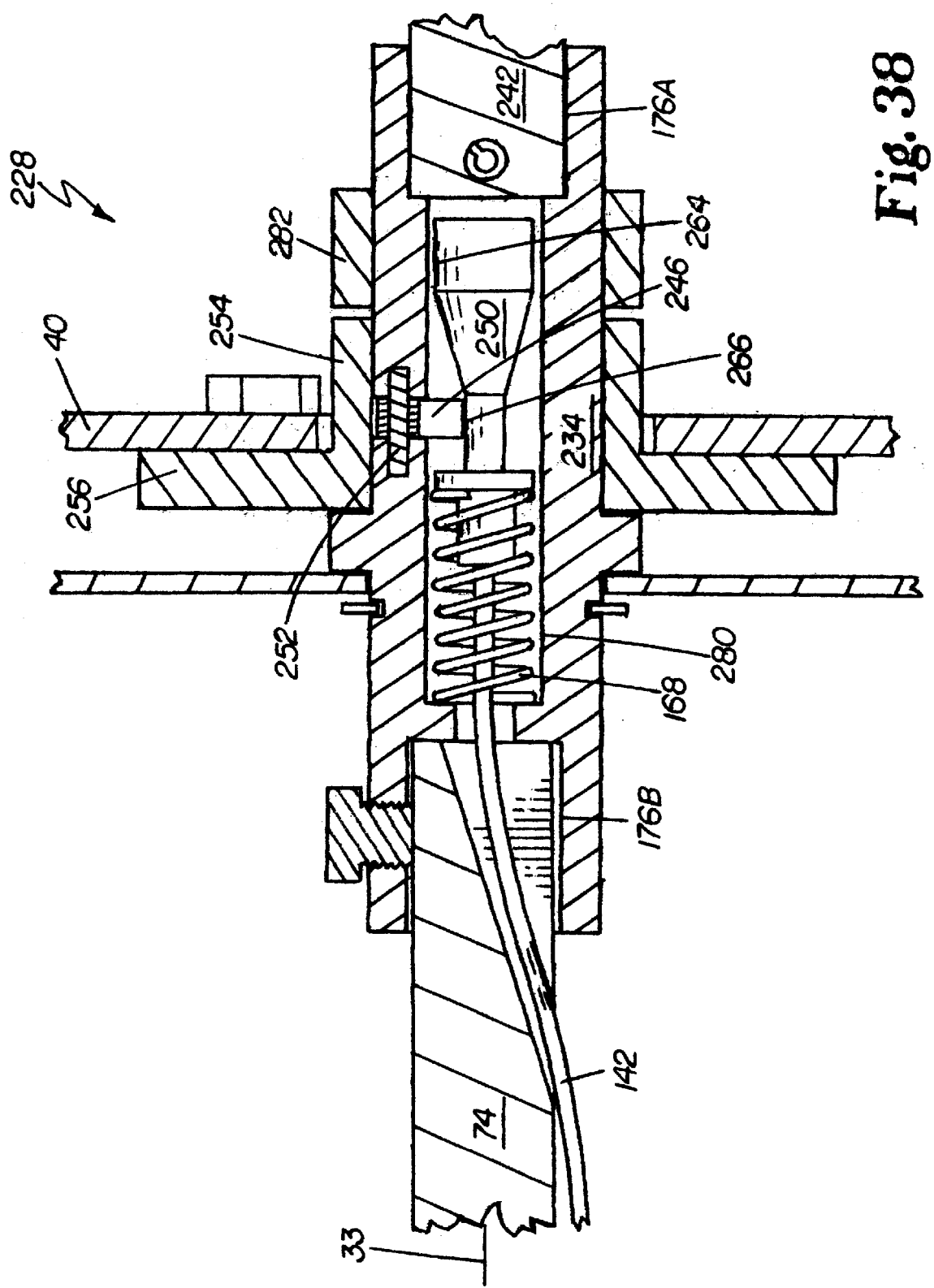
FIG. 38 is a side cross-sectional view of a further embodiment of a gear shaft and hub of a drive train in a disengaged position in accordance with the invention.

An exemplary disengagement apparatus 228 comprising the gear shaft 234 and hub 236 is depicted in FIGS. 37 through 43. In FIGS. 37 and 38, the hub 236 is shown as being retained on the gear shaft 234 by a retainer ring or bushing 282. The shaft member 234 is shown with a radial opening 244 through which a controllable cog 246 may be projected into an opening 248 in the hub 236, engaging the hub to the shaft member for simultaneous rotation. The cog 246 is shown in FIG. 37 in an engaged position. As already described relative to FIGS. 13 and 13A, in the event of a fire or high temperature, a thermal fuse connected to disconnect cable 142 will melt, releasing the disconnect cable. In FIG. 38, movement of a spring-biased key 250 by release of disconnect cable 142 permits the cog 246 to swivel inward due to downstream biasing spring forces (from spring 66) which rotate the gear 40 and hub 236. The cog 246 swivels in a radial plane (relative to central axis 33) to a disengagement position, i.e. outside of cog opening 260. Thus, in FIG. 38, hub 236 and attached gear 40 may freely rotate about the shaft member 234 free of restraining force from the motor shaft 242.

The key 260 of this embodiment is depicted in FIGS. 39–43. The key 250 is an elongate device which is concentric about a central axis 33 and has a central longitudinal borehole 292 beginning at a first end 286. A spring 168 (not shown) may be mounted on the first end 286. The key has a second end 288 in which is an aglet hole 298. An intermediate borehole 294 is also shown. The exterior surface of the key 250 includes an engagement surface 264, a disengagement surface 266, and an intermediate surface 296 connecting the two. As depicted in FIG. 43, a disconnect cable 142 is passed through the borehole 292 and retained therein by aglet 300 fixed to the cable.

A further embodiment of a disengagement apparatus 228 is shown in FIGS. 44, 45, 46 and 47. In this version, the gear shaft 234 is varied by adding an opening 306 opposite the cog opening 258. Opening 306 accommodates a key 250 whose first end 314 is mounted on, and pivots about, a cross pivot pin 310. The cog key 250 is shown with a general inverted U-shape as viewed axially. The key has two parallel legs 320 joined at the second end 316 by a cross-piece 322 having the two exposed surfaces, i.e. engagement surface 264 and disengagement surface 266. Surfaces 264 and 266 limit inward movement of a cog 246 in an engagement position and a disengagement position, respectively. Surface 266 is oblique relative to the engagement surface 264, generally being at an angle therefrom of about 35–45 degrees. The configuration of the shaft 234 and key 250 limit the inward movement of the cog key 250 when the disconnect cable 142 is under tension. From the engagement position shown in FIG. 44, the key 250 may pivot in only one direction, i.e. toward the first end 238 of the shaft 234. The cog key 250 includes a transverse key pin 308 to which the disconnect cable 142 and spring 168 are attached. When tension in the disconnect cable 142 is released by melting of the attached thermal fuse (see FIG. 13A), spring 168 will motivate the key 250 to pivot to a disengagement position, allowing the cog to swivel inward out of the cog opening 260 in the hub. Opening 306 limits the swivel angle so that the key 250 will not go beyond the specified disengagement position, where the disengagement surface 266 limits further cog movement.

Figure 44:
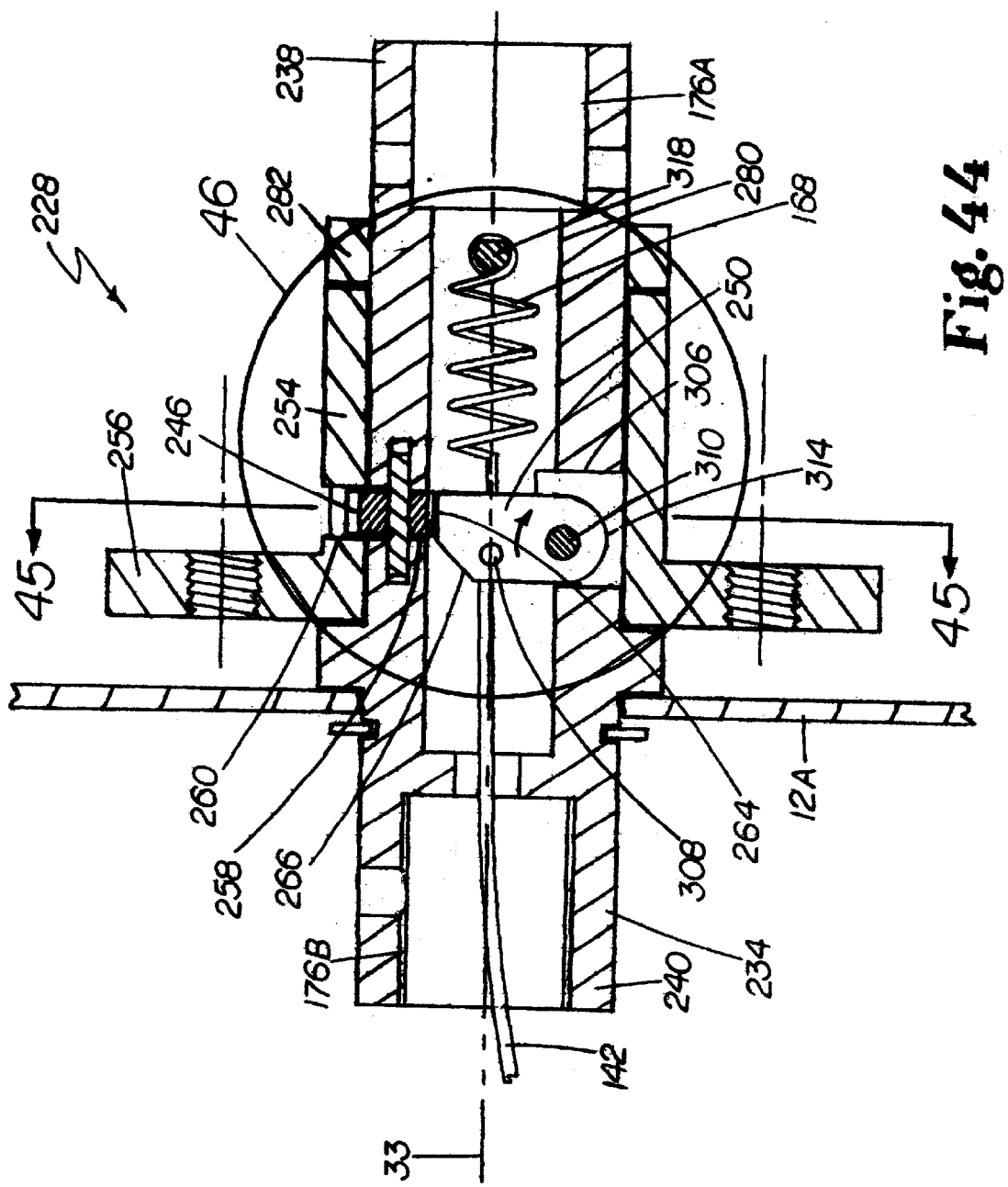
FIG. 44 is a cross-sectional side view of another embodiment of an engaged gear shaft and hub in a drive train of the invention.
Figure 46:
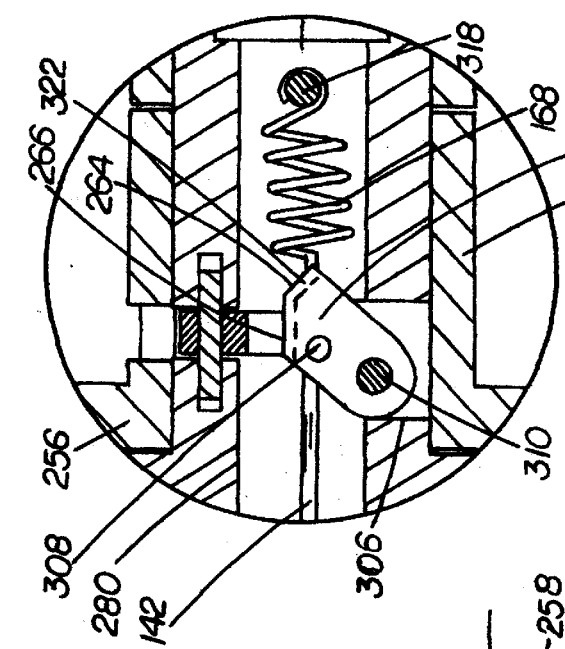
FIG. 46 is an enlarged side view of a portion of an gear shaft and hub of a drive train which has been disengaged, as corresponding to region 46 of FIG. 44.

In FIG. 44, the spring has one end fixed to cross-pin 318 near the gear shaft's first end 238. The cross-pin will draw the key 250 from its engagement position upon release of tension in cable 142.

Figure 45:
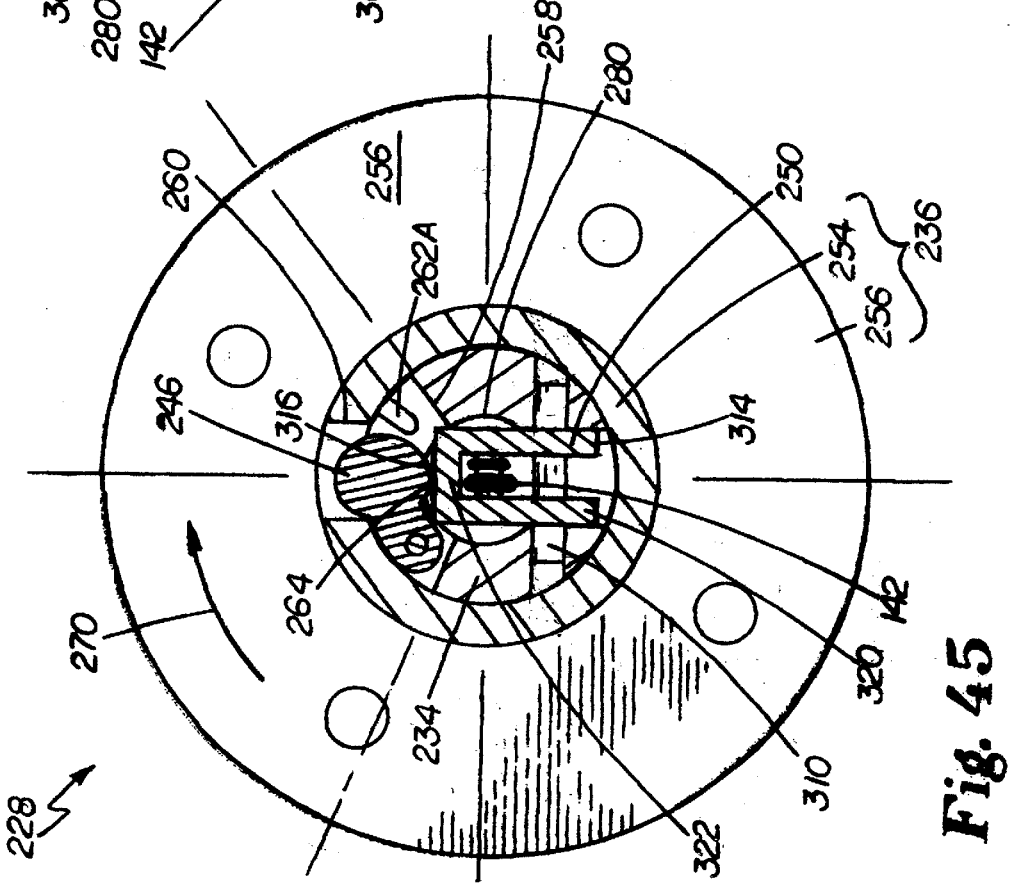
FIG. 45 is a cross-sectional view of an engaged gear shaft and hub in a drive train of the invention, as taken along line 45—45 of FIG. 44.

A hub retainer ring or bushing 282 is shown in FIGS. 44 and 45, and is used to retain rotatable hub 236 in place, as is shown in the embodiment of FIGS. 37 and 38.

Figure 47:
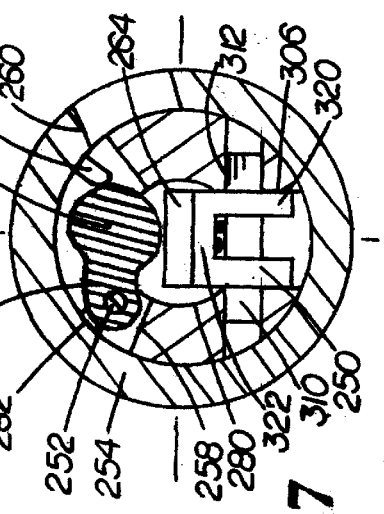
FIG. 47 is a cross-sectional view of a portion of a disengaged gear shaft and hub of a drive train of the invention, corresponding to the view of FIG. 45.
Figure 47A:
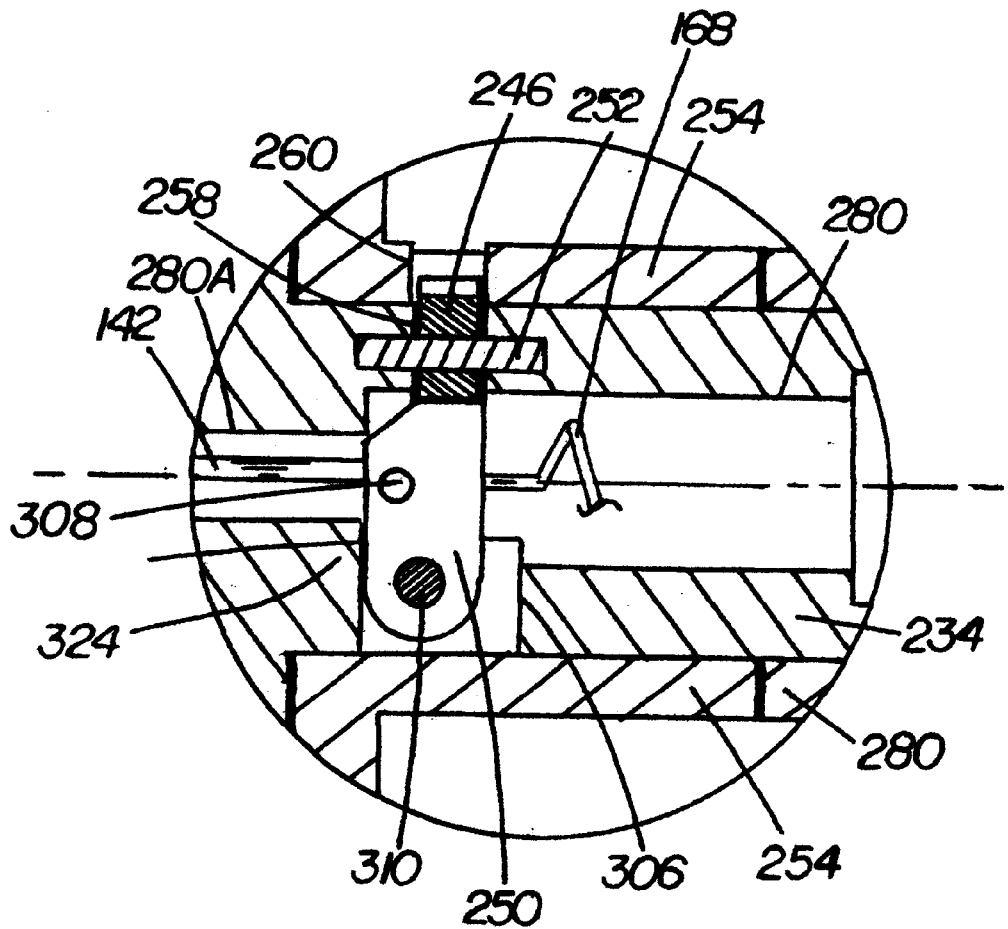
FIG. 47A is a cross-sectional view of a portion of an engaged gear shaft and hub of a drive train of another embodiment of the invention, corresponding to portion 46 of FIG. 44.
Figure 48:
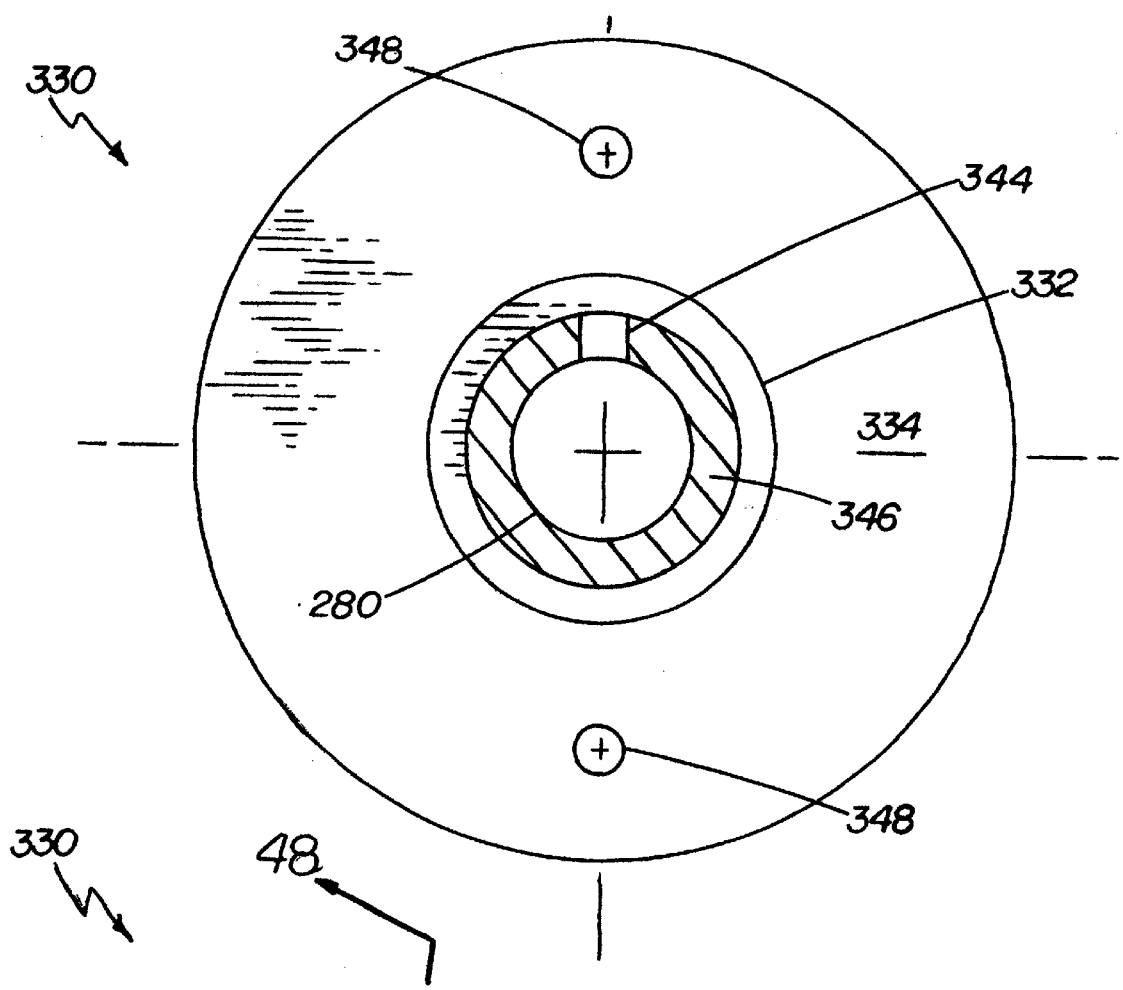
FIG. 48 is a cross-sectional view of a fixed gear shaft and hub of a drive train of the invention, as taken along line 48—48 of FIG. 49.
Figure 49:
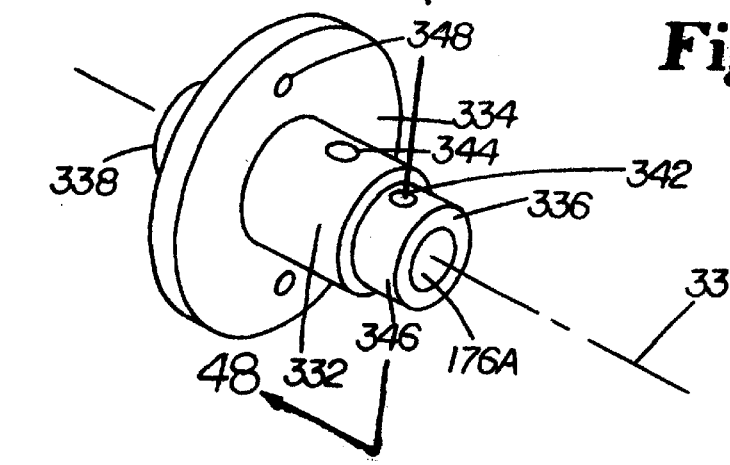
FIG. 49 is a perspective view of a fixed gear shaft and hub of a drive train of the invention.
Figure 50:
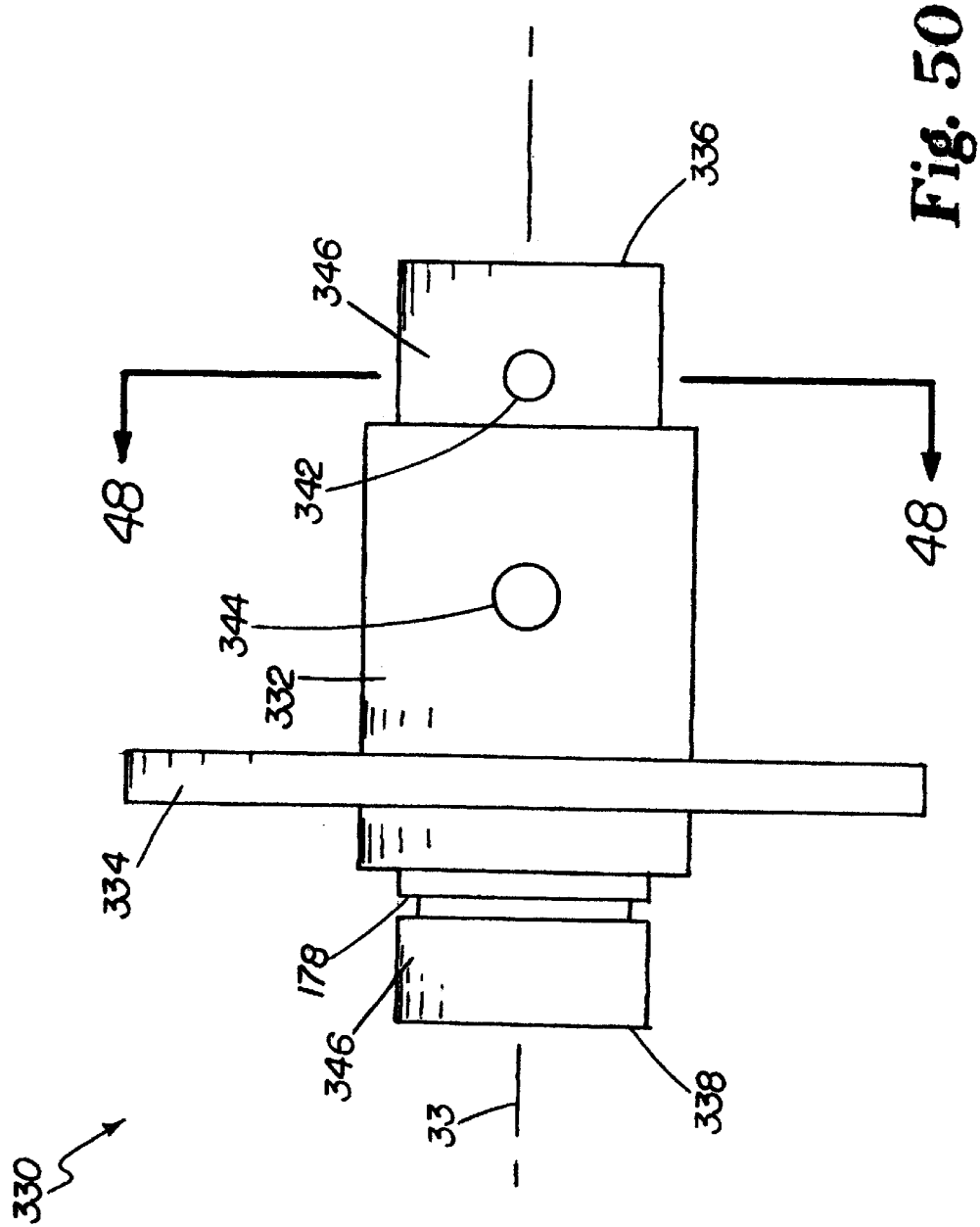
FIG. 50 is a side view of a fixed gear shaft and hub of a drive train of the invention.
Figure 51:
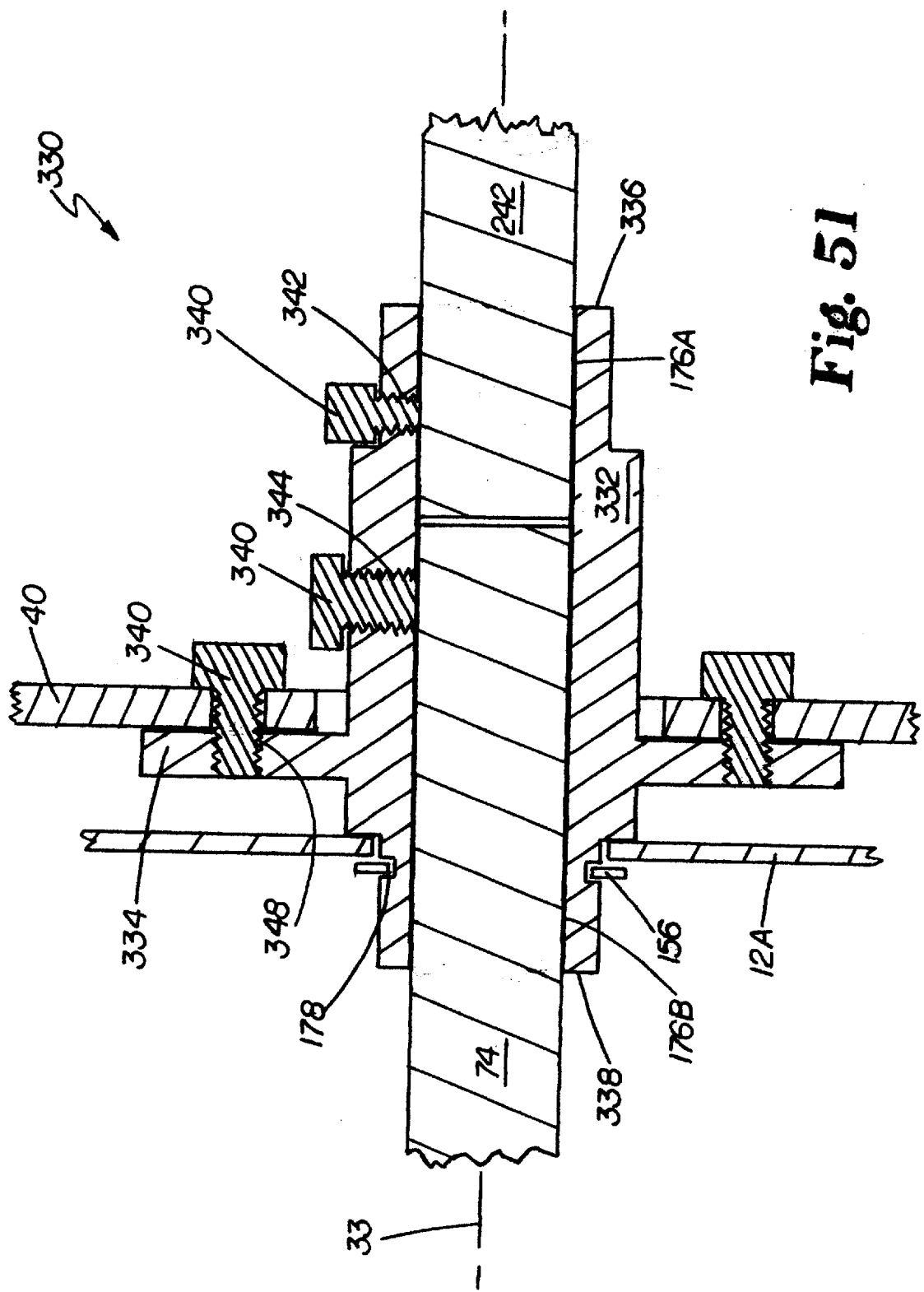
FIG. 51 is a cross-sectional view of a fixed gear shaft and hub as connected in a drive train of the invention.

Turning now to FIG. 47A, another modification to the gear shaft 234 is shown, i.e. forming a region 324 with a bore 280A of reduced diameter, adjacent the cog key 250. This region 324 ensures that the cog key 250 may pivot in only one direction from the engagement position.

In each of the described versions of the disengagement apparatus 228, the cog 246 is shown as having a shape generally appearing as an arcuate stem 302 attached to an arcuate body 304 of a circle or compressed circle. The cog 246 swivels about the cog pin 252 which passes through the stem 302. This shape is shown in FIGS. 45 and 47, for example, and is a preferred design, inasmuch as the cog has sufficient area to provide strength, the required area of opening 258 is minimized, and the cog will fully swivel from an engaged position to a disengaged position. Furthermore, when the cog key 250 is activated to disengage the cog 246, the edge of opening 260 will contact a sloping i.e. rounded edge of the cog to enable slippage thereon as it pivots the cog inward. This positive movement is a "failsafe" factor.

Some dampers are not intended as fire-safe but are merely for controlling airflow at desired flowrates, i.e. "volume dampers". Thus, a gear shaft and hub as previously described are combined in a unitary "fixed hub" device 330 which is interchangeable with the various embodiments of disengagement apparatus 228, without the disengagement feature. As shown in FIGS. 48–51, a fixed hub device 330 includes a hollow shaft 332 with a radial flange 334 mounted thereon. A first end 336 of shaft 332 includes a socket 176A into which a motor or controller shaft 242 is installed and fixed for example by a set screw 340 in screw hole 344. Likewise, a second end 338 of the shaft includes a socket 176B into which a continuation shaft 74 is fixed for example by set screw 340 in screw hole 346. The shaft 332 may have a uniform diameter, or may have various diameters over its length if desired. In these figures, the shaft is shown as having a reduced diameter portion 346 adjacent the first end 336. A gear 40 may be attached to the radial flange 334, using screw fasteners 340 in screw holes 348. The fixed hub device 330 may be rotatably attached to a wall 12A with a retainer ring 156 in an outer ring groove 178.

Figure 55:
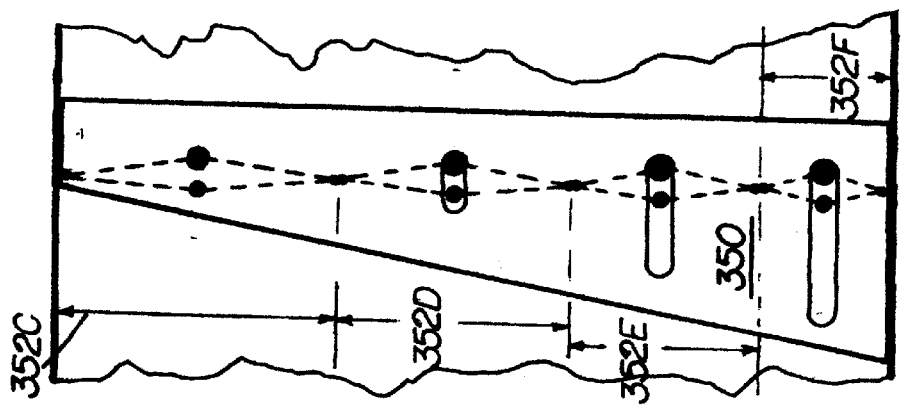
FIGS. 52 through 55 are side views of a progressive action slide assembly in various stages of damper closure, in accordance with a further embodiment of a damper of the invention.
Figure 54:
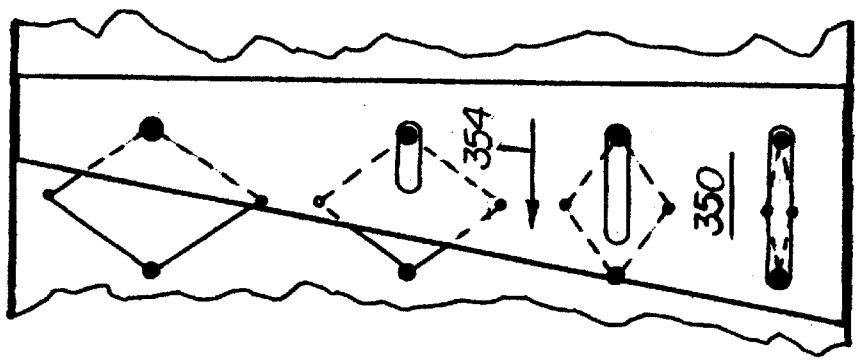
Figure 53:
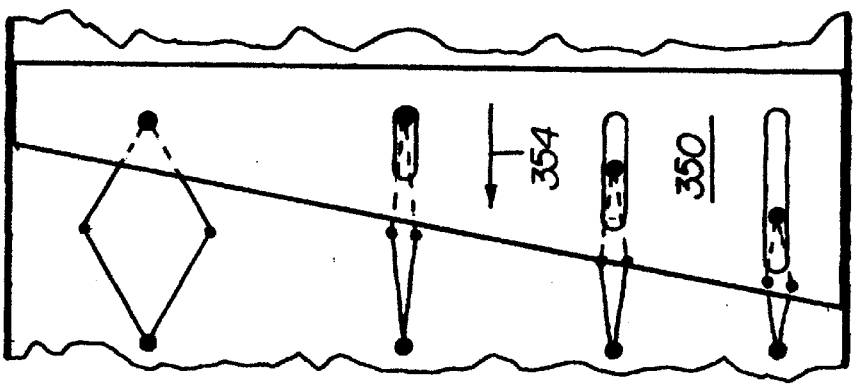
Figure 52:
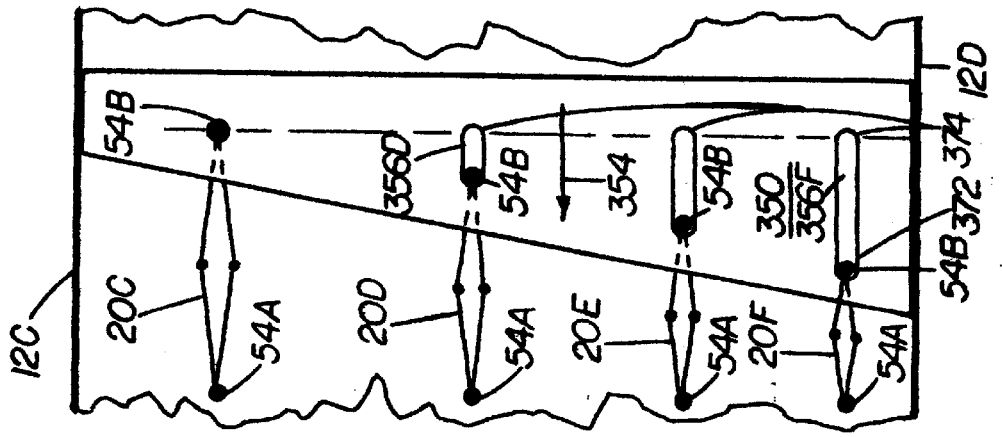

In another feature of the invention, the closure 18 may be configured to use damper blades 20 of differing panel sizes. Such blades 20 will of course have differing values of maximum closure length. Thus, the distance the rack tee must be closed will vary from blade to blade, and some blades will always remain partially open (partially closed). In the feature depicted in FIGS. 52 through 55, a progressive action rack tee 350 is depicted as it progressively moves in direction 354 to close a closure 18 from a fully open position (FIG. 52) to a fully closed position (FIG. 55). In this example, four blades 20C, 20D, 20E and 20F have closing spans 352C, 352D, 352E and 352F of 12, 10, 8, and 6 inches respectively, for a total span of 36 inches between damper walls 12C and 12D. Thus, they are spaced so that when all blades are in the closed position, the damper is fully closed. As shown, each blade has a fixed hinge pin 54A and a driven hinge pin 54B. The fixed hinge pins 54 are shown as arrayed in a straight line across the flow channel. The driven hinge pin 54B of blade 20C is fixedly mounted in the rack tee 350. The driven hinge pin 54B of each shorter blade 20D, 20E and 20F is mounted in a linear slot 356D, 356E and 356F, respectively to be moved by the slot ends.

In FIGS. 52–55, the driven hinge pins 54B are moved by the rack tee 350 to the left to progressively shut the damper, and to the right to progressively open the damper. In this example, driven hinge pins 54B of blades 20D, 20E and 20F will be at the left end 372 of the slots 356D, 356E and 356F when the damper is fully open, and at the right end 374 of the slots when the damper is fully closed.

A slot seal member 360 shown in FIG. 57 may be used in conjunction with the progressive action rack tee 350 to achieve particular relationships of Percent OF Full Open (POFO) versus Percent Actuation of the rack tee. As shown in FIG. 57, a driven hinge pin 34B passes through a slot in a wall 358, and passes through a slot seal member 360 which simultaneously (a) exerts a clutch force on the hinge pin which must be overcome to achieve movement of the pin, and (b) effectively seals the slot from leakage. In accordance with the invention, the slot seal member 360 may be applied over a slot 56 of an inner channel wall (see FIG. 11), or over a slot 356D, 356E, or 356F in rack tee 350. In either case, the slot is effectively sealed from significant gas leakage.

The slot seal member 360 is formed of a flexible material such as an elastomer or an elastomer coated fabric. As shown, a linear slit 362 is cut between two spaced-apart punch-holes 364. The slot seal member 360 may be joined by e.g. cement 366 over a slot 56 in a wall 358. Each punch-hole 364 is positioned and attached over an end of a slot 56, 356D, 356E, or 356F, whereby the hinge pin 34B slides within slit 362 and the punch-holes 364. The punch-holes tend to retain the hinge pin 34B within the slot ends 372 and 374, providing a resistance to movement. The slit 362 provides resistance to movement, so that unless overcome by a greater force, the slit will hold the hinge pin 34B in a given position in the slot. The resistance to pin movement in the slit 362 may be controlled by varying the type of material, thickness of the seal member 360, and width of the slit relative to the hinge pin diameter.

The rack tee 350 is typically exterior of a damper wall 56 or 356. The driven hinge pins 34B pass through the damper wall, i.e. through slots 56, as well as through slots 356 in the rack tee 350. The slot seal members 360 may be used in several different ways by application to slots 56 and/or slots 356.

Figure 56:
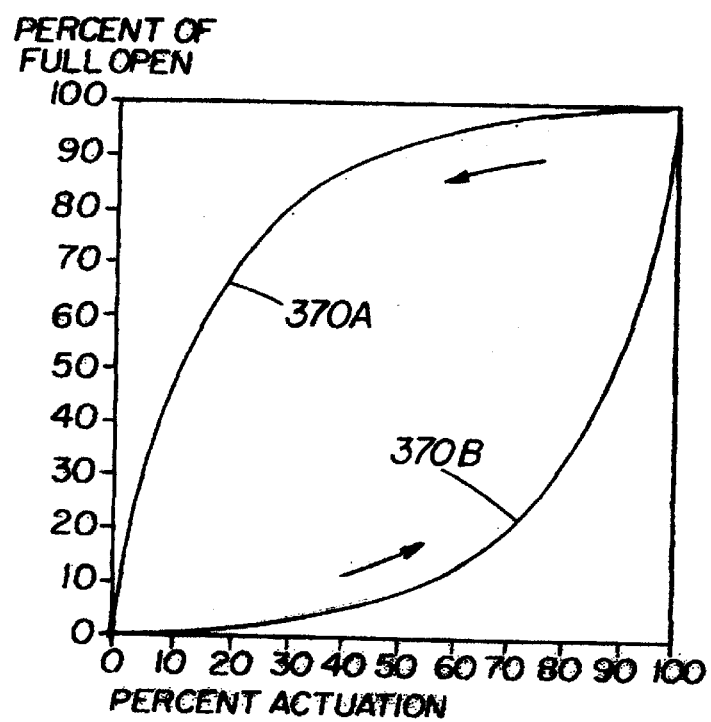
FIG. 56 is a graphical view of an exemplary relationship between the degree of actuation and the resulting gas flow area of a damper in accordance with a progressive action slide assembly of the invention.

In a first embodiment, seen in FIGS. 52–55, seal members 360 are placed over slots 56 in the damper wall 12A but not over slots 356 in the rack tee 350. In this version, a driven hinge pin 54B will begin moving toward the closed position only when it engages the second end of the particular slot 356 in the rack tee. The hinge pins 54B for blades 20D, 20E and 20F will sequentially engage the slot ends 374, all attaining the fully closed position simultaneously. The resulting closing curve 370A for this version is shown in FIG. 56, together with a resulting opening curve 370B. It is noted that these curves 370A, 370B are exponential in nature. The start of a closing motion, or the start of an opening motion, is very gradual. Unlike the use of equal blade lengths and simultaneous equal closing (shown in FIG. 10), two different curves 370A, 370B are followed.

In another embodiment, the seal members 360 may be applied to the rack tee slots 356D, 356E and 356F. In this case, the opening and closing curves will differ in that they will be less gradual at initial opening or closing. In any case, the curves 370A, 370B will vary depending upon the numbers and sizes of blades 20 and where the seal members 360 are applied.

It should be noted that seal members 360 may be placed on slots 56 of the flow channel wall 12A as well as on the rack tee slots 356D, 356E, and 356F. In this case, seal members 360A on the channel wall 12A may be formed to provide greater resistance that the seal members 360B on the rack tee 350, or vice versa. In this way, for example, the channel wall slits may be sealed while the rack tee seals control driven pin movement.

While a number of different embodiments are described in this application, it is contemplated that other variations may be made to the invention without significantly changing its performance; such fall within the purview of the invention.

Thus, it is apparent to those skilled in the art that further additional changes, additions and modifications may be made in the improved damper apparatus as disclosed herein without departing from the spirit and scope of the invention as defined in the following claims.

What is claimed is:

1. A damper apparatus for controlling gas flow in a duct, comprising:
    inner walls defining a gas-confining inner channel between inlet and outlet openings;
    a closure operable between an open position and a closed position, said closure comprising:
        a blade formed of first, second, third and fourth elongate panels, each panel having opposed hinged edges;
        four parallel hinge pins connecting hinge edges of the panels in a quadrilateral wherein each panel is rotatable relative to adjacent connected panels;
        a stationary hingepin with opposed ends, said stationary hingepin connecting first hinged edges of said first panel and said second panel, said stationary hingepin having its ends mounted in opposing inner walls;
        a first floating hingepin connecting second hinged edge of said first panel and first hinged edge of said third panel;
        a second floating hingepin connecting second hinged edge of said second panel and first hinged edge of said fourth panel;
        a drive hingepin connecting second hinged edges of said third panel and said fourth panel;
    whereby said panels form a quadrilateral with four exterior angles between adjacent panels; and
    drive means communicating with said drive hingepin for driving said drive hingepin to move said closure between said open position and said closed position;
    wherein in said closed position, the exterior angle between said third and fourth panels is less than 180 degrees.

2. A damper apparatus of claim 1 wherein in said closed position said exterior angle between said third and fourth panels is between about 165 and 180 degrees.

3. A damper apparatus of claim 1 wherein in said closed position said exterior angle between said third and fourth panels is between about 170 degrees and about 176 degrees.

4. A damper apparatus of claim 1 wherein the distance between said stationary hingepin and a floating hingepin exceeds the distance between said drive hingepin and a floating hingepin.

5. A damper apparatus of claim 1, further comprising a biasing means to bias said closure to one of said open position and said closed position.

6. A damper apparatus of claim 1, wherein said apparatus comprises at least two blades of substantially identical dimensions.

7. A damper apparatus of claim 1, wherein said apparatus comprises at least two blades with space therebetween, further comprising at least one blade seal attached to one of said blades for closing and sealing said space when said closure is in said closed position.

8. A damper apparatus of claim 7, wherein said blade seal comprises:
    a sealing member attached to one panel of a first blade to extend to and compress against a panel of a second blade, generally coextensive with a floating hinge pin thereof.

9. A damper apparatus of claim 8, wherein movement of said closure to said closed position having an outer angle between said third and fourth panels of less than 180 degrees compresses said sealing member against said second blade.

10. A damper apparatus of claim 8, wherein said sealing member is formed of a thin flexible material bent along a longitudinal axis in a direction whereby said seal compresses and seals against an opposite panel of an adjacent blade in said closed position.

11. A damper apparatus of claim 10, wherein said blade seal comprises spring metal.

12. A damper apparatus of claim 7, said blade seal comprising:
    a first blade seal fixed on a panel of a first blade along a first floating hingepin thereof; and
    a second blade seal fixed on a panel of an adjacent blade along a second floating hingepin thereof;
    wherein in said closed position said first blade seal is coextensive with a portion of said first floating hingepin to seal an equivalent coextensive portion of said second blade; and
    wherein in said closed position said second blade seal is coextensive with the remaining portion of said first floating hingepin to seal the remaining portion of said first blade.

13. A damper apparatus of claim 7, wherein each said blade seal of a blade compressively covers an adjacent floating hingepin of the same blade when in said open position.

14. A damper apparatus of claim 1, wherein said drive means comprises:
   a motor;
   a motor shaft drivable by said motor between angular limits;
   a gear shaft attached to said motor shaft for rotation thereby;
   a gear hub mounted on said gear shaft for rotation thereby;
   a gear mounted on said gear hub for rotation thereby;
   a movable slide assembly with a toothed rack, said slide assembly engaging said drive hingepin to move it generally linearly; and
   wherein said gear engages said toothed rack to move said movable slide assembly.

15. A damper apparatus of claim 14, further comprising a disengagement apparatus between said motor shaft and said gear for disengagement therebetween.

16. A damper apparatus of claim 15, wherein said disengagement apparatus comprises:
   a gear hub attached coaxially to said gear;
   a gear shaft passing through said gear hub and coaxial therewith; and
   a rotatably movable cog connecting said gear shaft to said gear hub for engagement therebetween, said cog movable to a disengaging position whereby gear rotates freely on said gear shaft.

17. A damper apparatus of claim 1 wherein said drive hingepin has at least one end movable in a slot in one of said inner walls by said drive means, and further comprising a slot seal formed of a flexible material configured to be joined to said inner wall and overcover said slot, said slot seal having holes therethrough coextensive with slot end portions and a slit joining said holes, wherein said slot seal seals said slot.

18. A damper apparatus for controlling gas flow in a duct, comprising:
   a duct having inlet and outlet openings;
   inner walls defining a gas-confining inner channel between said inlet and outlet openings;
   a multi-blade closure operable between an open position and a closed position, each said blade comprising:
      four panels hinged with a stationary hingepin having its ends mounted at fixed positions in opposing inner walls, a linearly movable drive hingepin and two floating hingepins to form a quadrilateral; and
      linear slots in an inner wall for passage therethrough of the drive hingepins of said blades;
      wherein when in a closed position, said blades have different closing spans ranging from a largest span to a smaller span, said apparatus further comprising:
   drive means for moving the drive hingepin of said blades between said open position and said closed position by substantially linear movement, said drive means including a slide plate communicating with said drive hingepins;
   wherein said slide plate is a progressive action slide plate for moving said drive hingepins sequentially between an open position and a closed position to produce an exponential opening flow curve having reduced flowrate during first portion of plate movement, and an exponential closing flow curve having less flowrate reduction during first portion of plate movement, said flow curves being compared to a damper with blades having uniform closing spans.

19. A damper apparatus of claim 18, wherein said stationary hingepins lie in a plane perpendicular to the general direction of airflow, the drive hingepin of the largest blade has an end engaging a fixed location on said slide plate, and an end of a drive hingepin of a smaller blade is movable in a linear slot in said slide plate, said slide plate slot having ends corresponding to the open position and the closed position of said smaller blade.

20. A damper apparatus of claim 18, further comprising a slot seal formed of a flexible material joined to said inner wall and overcover said inner wall slot, said slot seal providing resistance to movement of said drive hingepin therethrough, said slot seal having holes therethrough coextensive with slot end portions and a slit joining said holes, wherein said slot seal reduces air leakage through said inner wall slot.

21. A damper apparatus of claim 18, wherein said drive means comprises:
   a slide plate positioned in an inner wall;
   linear slots in said inner wall for passage therethrough of the drive hingepins of said blades to communicate with said slide plate;
   wherein said slide plate is a progressive action slide plate for moving said drive hingepins sequentially between an open position and a closed position to produce an exponential opening flow curve having reduced flowrate during first portion of plate movement, and an exponential closing flow curve having less flowrate reduction during first portion of plate movement, said flow curves being compared to a damper with blades having uniform closing spans.

22. A damper apparatus for controlling gas flow in a a duct, comprising:
   a duct having inlet and outlet openings; inner walls defining a gas-confining inner channel between said inlet and outlet openings;
   inner walls defining a gas-confining inner channel between said inlet and outlet openings;
   a multi-blade closure operable between an open position and a closed position, each said blade comprising:
      four panels hinged with a stationary hingepin having its ends mounted at fixed positions in opposing inner walls, a linearly movable drive hingepin, and two floating hingepins to form a quadrilateral, wherein, when in a closed position, said blades have different closing spans ranging from a largest span to a smaller span, said apparatus further comprising:
   linear slots in an inner wall for passage therethrough of the drive hingepin of said blades; and
   drive means for moving the drive hingepins of said blades between said open position and said closed position by substantially linear movement, said drive means including a slide plate communicating with said drive hingepins;
   wherein said stationary hingepins lie in a plane perpendicular to the general direction of airflow, the drive hingepin of said largest blade has an end engaging a fixed location on said slide plate, and
   wherein an end of a drive hingepin of said smaller blade is movable in a linear slot in said slide plate, said slide plate slot having ends corresponding to said open position and said closed position of said smaller blade; and
   wherein said slide plate is a progressive action slide plate for moving said drive hingepins sequentially between an open position and a closed position to produce an exponential opening flow curve having enhanced flow-rate during first portion of plate movement, and an exponential closing flow curve having enhanced flow-rate during first portion of plate movement, and an exponential closing flow curve having enhanced flow-rate reduction during first portion of plate movement, said flow curves being compared to a damper with blades having equal closing spans.

23. A damper apparatus of claim 22, further comprising a slot seal formed of a flexible material joined to said slide plate to overcover said slide plate slot, said slot seal providing resistance to movement of said drive hingepin therethrough greater than resistance to movement at said inner wall slot, said slot seal having holes therethrough coextensive with slot end portions and a slit joining said holes.

24. A damper apparatus for controlling gas flow in a duct, comprising:

inner walls defining a gas-confining inner channel between inlet and outlet openings;

a closure within said inner walls;

motor means;

motor shaft attached to said motor means for rotation thereby;

drive means connecting said motor shaft to said closure for operating said closure between an open position and a closed position, said drive means comprising:
rotatable means operating to open and close said closure;
a disengagement apparatus for engaging and disengaging said motor shaft from said rotatable means, said disengagement apparatus comprising:
a gear shaft attached to said motor shaft for rotation therewith about a central axis;
a hub coaxially mounted on said gear shaft for controllable one of rotation therewith and rotation thereabout, said rotatable means mounted on said hub.

25. A damper apparatus of claim 24, wherein said rotatable means comprises a gear.

26. A damper apparatus of claim 24, wherein said disengagement apparatus further comprises:

an opening in said gear shaft;

an opening in said hub;

a cog rotatable within said gear shaft opening and extendable into said hub opening for engagement therewith;

a spring-biased key movable between an engagement position and a disengagement position within said gear shaft;

wherein said hub is biased relative to said gear shaft whereby said hub rotates cog inwardly from said hub opening when key is in a disengagement position.

27. A damper apparatus of claim 26, wherein said cog rotates about an axis parallel to said gear shaft axis.

28. A damper apparatus of claim 27, wherein said cog is mounted on a cog pin rotatable in slots in said gear shaft.

29. A damper apparatus of claim 27, further comprising two sets of radially distant cog pin slots in said gear shaft wherein said cog pin is mounted in one of said sets for one of clockwise movement and counterclockwise movement of hub about said gear shaft.

30. A damper apparatus of claim 27, wherein said key is held in an engagement position by a releasable member.

31. A damper apparatus of claim 30, wherein said releasable member comprises a cable attached to a meltable thermal fuse, for disengagement at a predetermined temperature.

32. A damper apparatus of claim 26 wherein said key has an engagement surface and a disengagement surface, said key axially movable for contact of said cog with one of said engagement surface and said disengagement surface.

33. A damper apparatus of claim 26 wherein said key is rotatable about a pivot pin mounted in said gear shaft at a right angle to said gear shaft axis, and having an engagement surface and a disengagement surface oblique to said engagement surface.

* * * * *